(12) United States Patent
Sato et al.

(10) Patent No.: US 11,195,061 B2
(45) Date of Patent: Dec. 7, 2021

(54) IMAGE GENERATION APPARATUS AND METHOD FOR GENERATING IMAGE

(71) Applicant: Panasonic Intellectual Property Management Co., Ltd., Osaka (JP)

(72) Inventors: Satoshi Sato, Kyoto (JP); Masahiko Saito, Kanagawa (JP); Takeo Azuma, Kyoto (JP); Kunio Nobori, Tokyo (JP); Nobuhiko Wakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 45 days.

(21) Appl. No.: 16/415,002

(22) Filed: May 17, 2019

(65) Prior Publication Data

US 2019/0279026 A1    Sep. 12, 2019

Related U.S. Application Data

(63) Continuation of application No. PCT/JP2018/029498, filed on Aug. 7, 2018.

(30) Foreign Application Priority Data

Sep. 12, 2017    (JP) .............................. JP2017-175234

(51) Int. Cl.
*G06K 9/62* (2006.01)
*G06T 7/246* (2017.01)
(Continued)

(52) U.S. Cl.
CPC ............... *G06K 9/628* (2013.01); *G06N 3/08* (2013.01); *G06T 7/00* (2013.01); *G06T 7/246* (2017.01);
(Continued)

(58) Field of Classification Search
CPC . G06T 2207/30242; G06T 2207/30252; G06T 7/00; G06T 7/246; H04N 5/232;
(Continued)

(56) References Cited

U.S. PATENT DOCUMENTS 6,643,414 B1 * 11/2003 Kadono ............... H04N 7/1675
348/E7.056
7,804,980 B2 * 9/2010 Sasaki .................... G06K 9/468
382/103
(Continued)

FOREIGN PATENT DOCUMENTS

JP    2013-165475 A    8/2013

OTHER PUBLICATIONS

International Search Report of PCT application No. PCT/JP2018/029498 dated Nov. 13, 2018.
(Continued)

*Primary Examiner* — Ian L Lemieux
(74) *Attorney, Agent, or Firm* — Wenderoth, Lind & Ponack, L.L.P.

(57) ABSTRACT

An image generation apparatus includes a processing circuit and a memory storing at least one computational image. The at least one computational image is a light-field image, a compressive sensing image, or a coded image. The processing circuit (a1) identifies a position of an object in the at least one computational image using a classification device, (a2) generates, using the at least one computational image, a display image in which an indication for highlighting the position of the object is superimposed, and (a3) outputs the display image.

9 Claims, 14 Drawing Sheets

(51) Int. Cl.
*G06N 3/08* (2006.01)
*H04N 5/232* (2006.01)
*G06T 7/00* (2017.01)

(52) U.S. Cl.
CPC ... *H04N 5/232* (2013.01); *G06T 2207/30242* (2013.01); *G06T 2207/30252* (2013.01)

(58) Field of Classification Search
CPC .......... G06K 9/00201; G06K 9/00805; G06K 9/00993; G06K 9/2054; G06K 9/209; G06K 9/3241; G06K 9/628; G06N 3/0454; G06N 3/08; G06N 3/084; G06N 3/126; G06N 5/003
See application file for complete search history.

(56) References Cited

U.S. PATENT DOCUMENTS

| | | | |
|---|---|---|---|
| 10,175,697 B1* | 1/2019 | Sachdeva | H04N 13/361 |
| 2004/0047513 A1* | 3/2004 | Kondo | G06T 7/194 382/254 |
| 2005/0180645 A1* | 8/2005 | Hasegawa | H04N 1/41 382/239 |
| 2009/0116732 A1* | 5/2009 | Zhou | H04N 13/261 382/154 |
| 2010/0104138 A1* | 4/2010 | Fardi | G06T 7/70 382/106 |
| 2012/0182388 A1* | 7/2012 | Lim | H04N 19/597 348/43 |
| 2012/0249550 A1* | 10/2012 | Akeley | H04N 5/232 345/419 |
| 2013/0044234 A1 | 2/2013 | Nagano et al. | |
| 2015/0003738 A1* | 1/2015 | Bernal | G06K 9/6249 382/195 |
| 2015/0003750 A1* | 1/2015 | Bernal | G06K 9/58 382/233 |
| 2015/0326781 A1* | 11/2015 | Higaki | H04N 5/23235 348/241 |
| 2016/0100152 A1* | 4/2016 | Park | G06T 7/174 382/154 |
| 2016/0171344 A1* | 6/2016 | Chen | G06K 9/6203 382/224 |
| 2018/0137642 A1* | 5/2018 | Malisiewicz | G06K 9/00201 |
| 2018/0260649 A1* | 9/2018 | Kadambe | G06K 9/20 |
| 2018/0365839 A1* | 12/2018 | Feng | G06T 7/11 |
| 2019/0035125 A1* | 1/2019 | Bellows | G06T 11/60 |
| 2019/0035159 A1* | 1/2019 | Tran | G06F 3/011 |
| 2019/0042865 A1* | 2/2019 | Vallespi-Gonzalez | G06K 9/00986 |
| 2020/0057905 A1* | 2/2020 | Maruyama | G01S 17/931 |

OTHER PUBLICATIONS

Alex Krizhevsky et al., "ImageNet Classification with Deep Convolutional Neural Networks", NIPS'12 Proceedings of the 25th International Conference on Neural Information Processing Systems, Dec. 2012.
Andreas Eitel et al., "Multimodal Deep Learning for Robust RGB-D Object Recognition", 2015 IEEE/RSJ International Conference on Intelligent Robots and Systems (IROS), Jul. 2015.
Yusuke Oike et al., "A 256×256 CMOS Image Sensor with ΔΣ-Based Single-Shot Compressed Sensing", IEEE International Solid-State Circuits Conference (ISSCC) Dig. of Tech. Papers, Feb. 2012.
M. Salman Asif et al., "FlatCam: Replacing Lenses with Masks and Computation", International Conference on Computer Vision Workshop (ICCVW), Dec. 2015, pp. 663-666.
Yusuke Nakamura et al., "Lensless Light-field Imaging with Fresnel Zone Aperture", 3rd International Workshop on Image Sensors and Imaging Systems (IWISS2016) ITE-IST2016-51, vol. 40, No. 40, Nov. 2016, pp. 7-8.
Michael B. Wakin et al., "An Architecture for Compressive Imaging", 2006 IEEE International Conference on Image Processing (ICIP), Oct. 2006, pp. 1273-1276.
Leonid I. Rudin et al., "Nonlinear total variation based noise removal algorithms", Physica D, vol. 60, Nov. 1992, pp. 259-268.
Shunsuke Ono et al., "Decorrelated Vectorial Total Variation", IEEE Conference on Computer Vision and Pattern Recognition (CVPR), Jun. 2014.
Jianwei Ma, "Improved Iterative Curvelet Thresholding for Compressed Sensing and Measurement", IEEE Transactions on Instrumentation and Measurement, vol. 60, No. 1, Jan. 2011, pp. 126-136.
Michal Aharon et al., "K-SVD: An Algorithm for Designing Overcomplete Dictionaries for Sparse Representation", IEEE Transactions on Signal Processing, vol. 54, No. 11, Nov. 2006, pp. 4311-4322.
Manya V. Afonso et al., "Fast Image Recovery Using Variable Splitting and Constrained Optimization", IEEE Transactions on Image Processing, vol. 19, No. 9, Sep. 2010, pp. 2345-2356.
Extended European Search Report dated Oct. 16, 2020 in corresponding European Patent Application No. 18856490.0.
Wang Anzhi et al.: "A Two-Stage Bayesian Integration Framework for Salient Object Detection on Light Field", Neural Processing Letters, Kluwer Academic Publishers, vol. 46, No. 3, Apr. 26, 2017, pp. 1083-1094, XP036371108.
Kang-Yu Ni et al.: "Foveated compressive imaging for low power vehicle fingerprinting and tracking in aerial imagery", Inverse Problems & Imaging, vol. 11, No. 1, Jan. 1, 2017, pp. 177-202, XP055734543.
Li Nianyi et al.: "Saliency Detection on Light Field", IEEE Transactions on Pattern Analysis and Machine Intelligence, IEEE Computer Society, USA, vol. 39, No. 8, Aug. 1, 2017, pp. 1605-1616, XP011655104.
Jun Zhang et al.: "Saliency Detection on Light Field: A Multi-Cue Approach", ACM Transactions on Multimedia Computing Communications and Applications, vol. 13, No. 3, Aug. 8, 2017, pp. 1-22, XP055734578.
Mingjun Ren et al.: "Fast Object Detection in Light Field Imaging by Integrating Deep Learning with Defocusing", Applied Sciences, vol. 7, No. 12, Dec. 17, 2017, pp. 1-11, XP055734573.

* cited by examiner

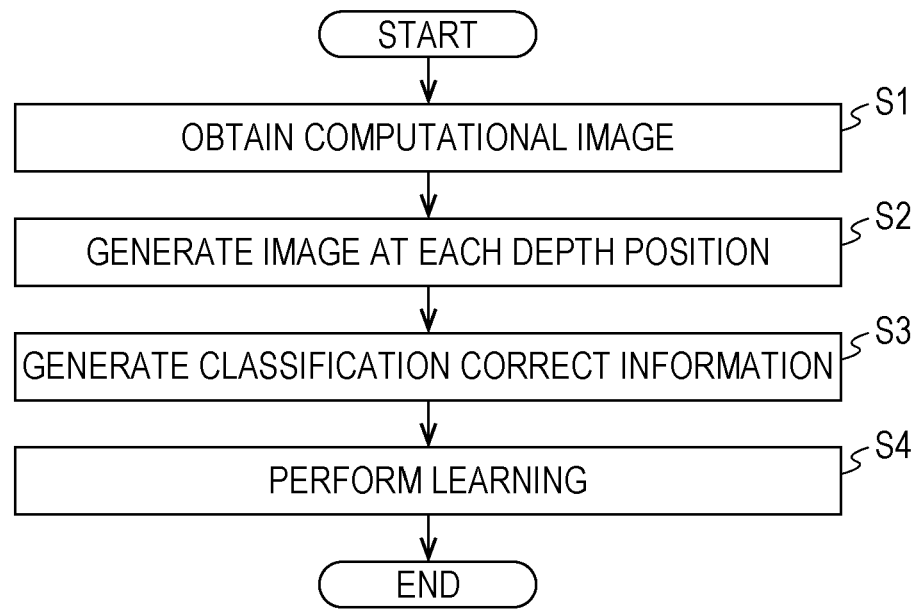
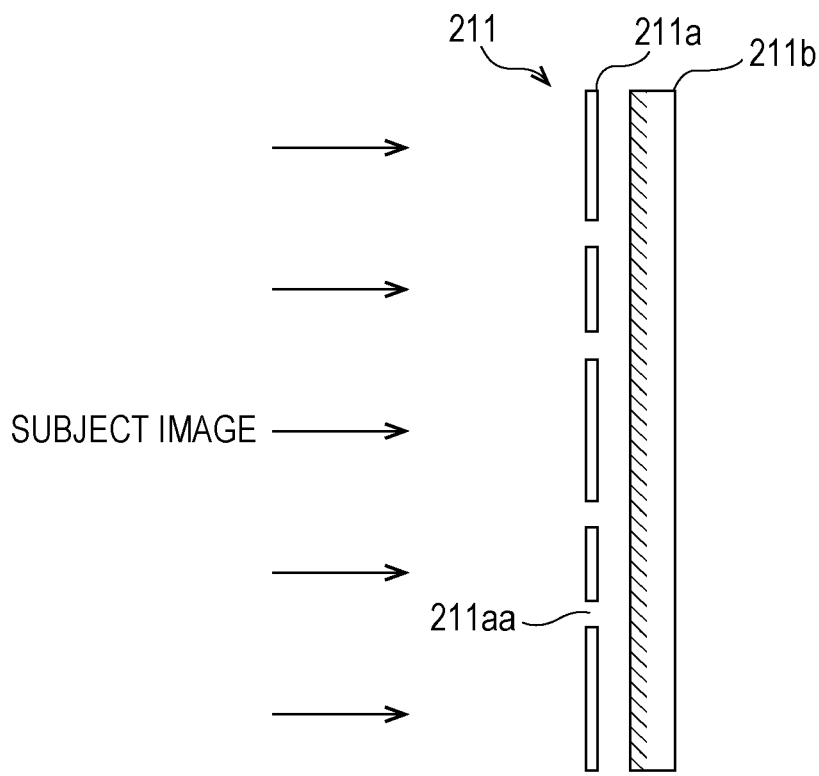

| y1 | y2 | y3 | y4 |
|----|----|----|----|
| y5 | y6 | y7 | y8 |
| y9 | y10 | y11 | y12 |
| y13 | y14 | y15 | y16 |

COMPUTATIONAL IMAGE

| x1 | x2 | x3 | x4 |
|----|----|----|----|
| x5 | x6 | x7 | x8 |
| x9 | x10 | x11 | x12 |
| x13 | x14 | x15 | x16 |

RECOVERY IMAGE

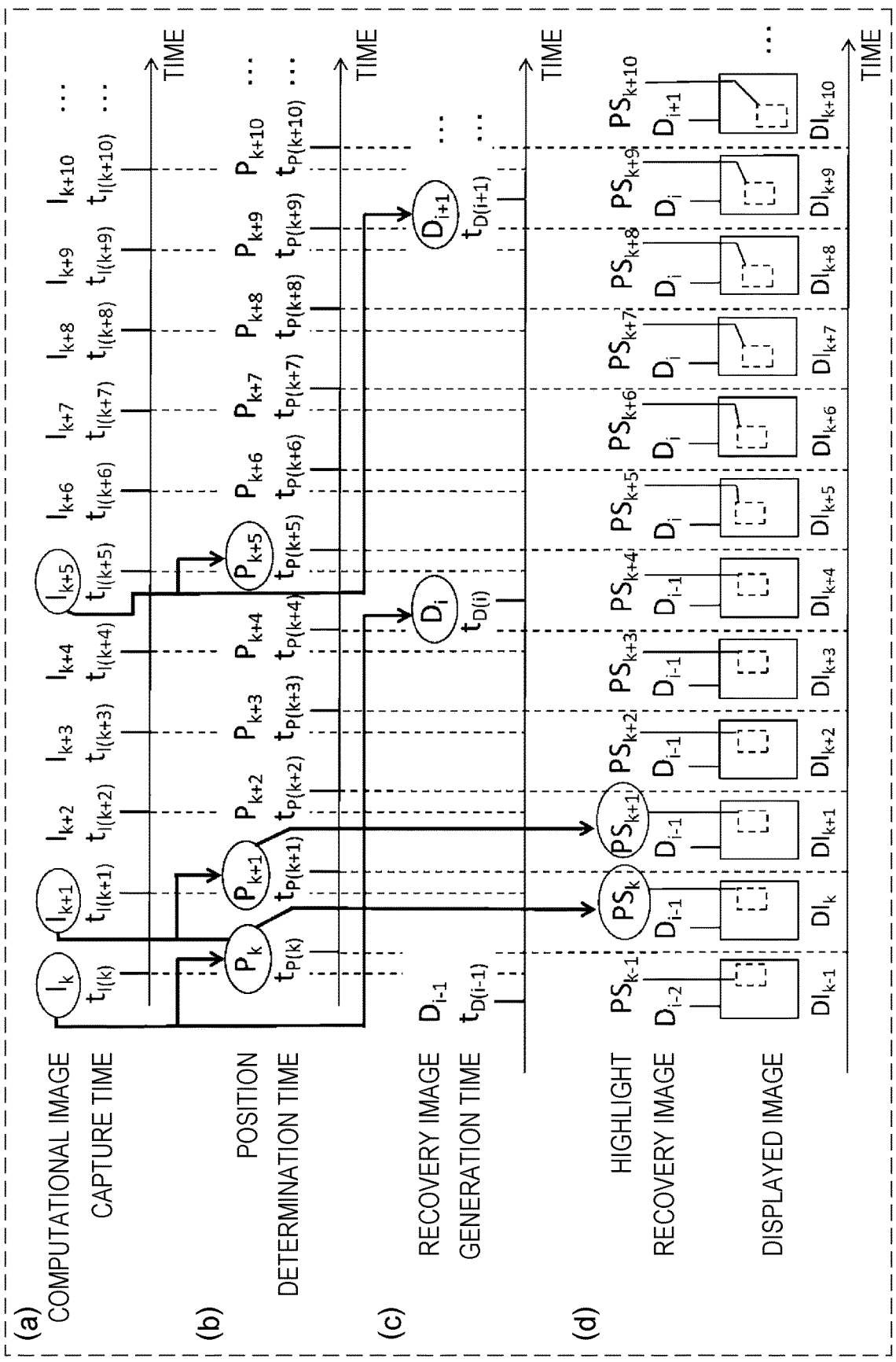

IMAGE GENERATION APPARATUS AND METHOD FOR GENERATING IMAGE

BACKGROUND

1. Technical Field

The present invention relates to an image generation apparatus and a method for generating an image.

2. Description of the Related Art

For autonomous driving vehicles and robots, techniques for identifying nearby objects and recognizing environments are important. A technique called "deep learning" is now attracting attention for object classification. Deep learning is machine learning employing a neural network having a multilayer structure. By using a neural network having a multilayer structure built using a large amount of learning data, more accurate classification performance than in conventional methods can be achieved. Image information is especially effective in object classification. In A. Krizhevsky, I. Sutskever, and G. E. Hinton, "ImageNet Classification with Deep Convolutional Neural Networks", NIPS' 12 Proceedings of the 25th International Conference on Neural Information Processing Systems, 2012, p. 1097-1105, a method for significantly improving object classification performance in conventional methods through deep learning in which image information is used as an input is disclosed. In order to perform accurate classification, input images need to have high resolution. If low-resolution images are used, for example, far subjects do not have sufficient resolution, thereby decreasing classification performance.

In Andreas Eitel, et al., "Multimodal Deep Learning for Robust RGB-D Object Recognition", 2015 IEEE/RSJ International Conference on Intelligent Robots and Systems (IROS), 2015, on the other hand, a method for further improving the classification performance of a neural network using depth information obtained by a three-dimensional rangefinder along with image information is disclosed. If depth information is used, nearby subjects and far subjects can be distinguished from each other. By using depth information, therefore, classification performance for far subjects can be improved. In addition, in order to recover a high-resolution image while capturing a low-resolution image, for example, a method called "compressive sensing" disclosed in Y. Oike and A. E. Gamal "A 256×256 CMOS Image Sensor with 4E-Based Single-Shot Compressed Sensing", 2012 IEEE International Solid-State Circuits Conference (ISSCC) Dig. of Tech. Papers, 2012, p. 386-387 is known.

SUMMARY

In order to obtain high-resolution image information, however, an expensive camera needs to be used, and an object classification system undesirably becomes costly. In addition, an accurate classification system that uses depth information undesirably needs an expensive three-dimensional rangefinder in order to obtain the depth information. Furthermore, in compressive sensing, a calculation cost for recovering a high-resolution image is enormous, and it is undesirably difficult to recover a high-resolution image in real time. For these reasons, when a classification system is used for autonomous driving of an automobile, a robot, an environment monitoring system, or the like, a problem is posed that a delay is caused in later stages, such as driving control.

One non-limiting and exemplary embodiment provides an image generation apparatus and a method for generating an image that improve object classification speed using images.

In one general aspect, the techniques disclosed here feature an image generation apparatus according to an aspect of the present disclosure including a processing circuit and a memory storing at least one computational image. The computational image is a light-field image, a compressive sensing image, or a coded image. The processing circuit (a1) identifies a position of an object in the at least one computational image using a classification device, (a2) generates, using the at least one computational image, a display image in which an indication for highlighting the position of the object is superimposed, and (a3) outputs the display image.

With the technique for generating an image in the present disclosure, object classification speed using images can be improved.

It should be noted that the above general or specific aspects may be implemented as a system, an apparatus, a method, an integrated circuit, a computer program, a computer-readable storage medium such as a storage disc, or any selective combination thereof. The computer-readable storage medium includes, for example, a nonvolatile storage medium such as a compact disc read-only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a flowchart illustrating an example of a main process performed by a learning apparatus illustrated in FIG. 2;

FIG. 5 is a diagram illustrating an example of a light-field camera including multiple pinholes;

FIG. 24 is a schematic diagram illustrating a method for generating an image according to another modification of the embodiment.

DETAILED DESCRIPTION

Figure 1:
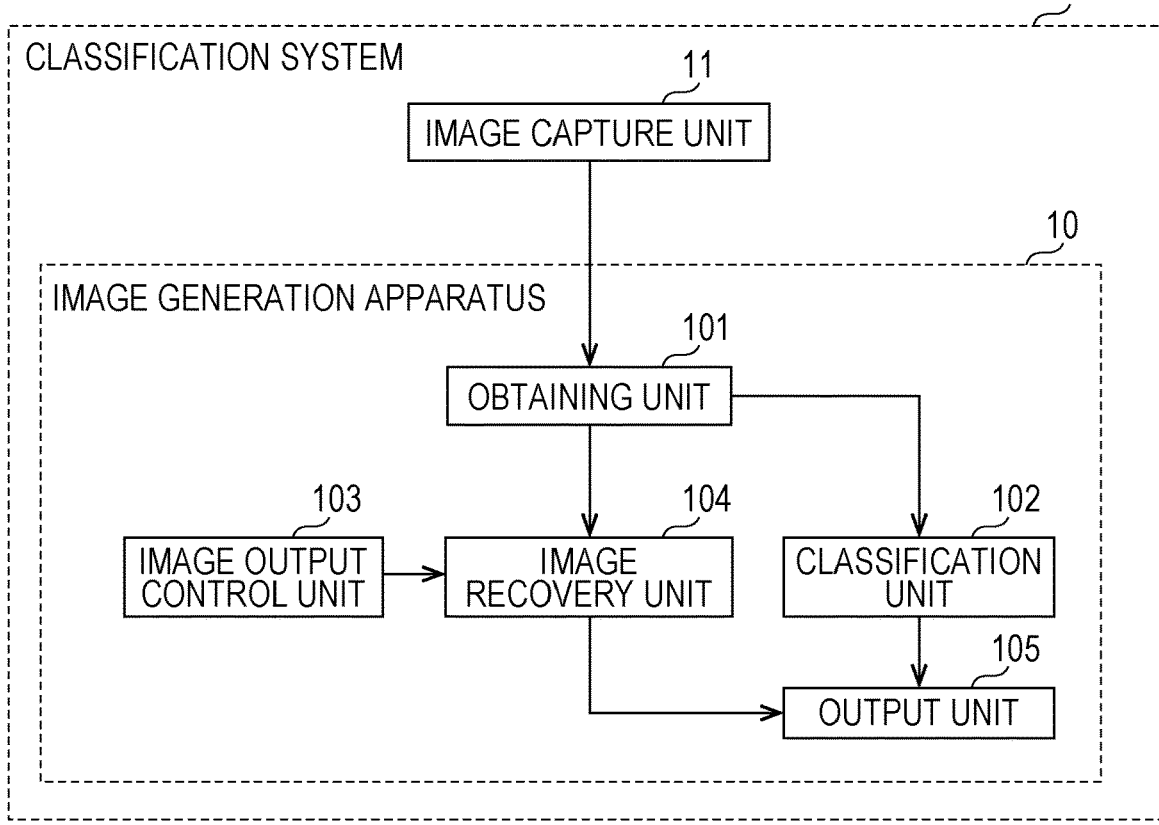
FIG. 1 is a schematic diagram illustrating an example of the functional configuration of a classification system including an image generation apparatus according to an embodiment.

As described in the "Background Art" section, mechanical apparatuses have become capable of achieving accurate classification techniques using machine learning such as deep learning. An attempt to apply such classification techniques to autonomous driving of vehicles and the operation of robots is underway. Since vehicles and robots are mobile objects, it is necessary to recognize nearby objects from images captured by cameras during movement. High classification speed, therefore, is required. A technique disclosed in A. Krizhevsky, I. Sutskever, and G. E. Hinton, "ImageNet Classification with Deep Convolutional Neural Networks", NIPS' 12 Proceedings of the 25th International Conference on Neural Information Processing Systems, 2012, p. 1097-1105 requires high-resolution images in order to achieve high classification accuracy. In order to obtain high-resolution images, not only an expensive camera is needed but also the amount of processing performed for high-resolution images becomes large, thereby causing a delay in processing. A technique disclosed in Andreas Eitel, et al., "Multimodal Deep Learning for Robust RGB-D Object Recognition", 2015 IEEE/RSJ International Conference on Intelligent Robots and Systems (IROS), 2015 requires an expensive three-dimensional rangefinder, which increases cost. In addition, because captured images and depth information need to be associated with each other in this technique, the amount of processing is large. In a technique disclosed in Y. Oike and A. E. Gamal "A 256×256 CMOS Image Sensor with 4E-Based Single-Shot Compressed Sensing", 2012 IEEE International Solid-State Circuits Conference (ISSCC) Dig. of Tech. Papers, 2012, p. 386-387, the amount of processing performed to recover high-resolution images from low-resolution images is enormous. The inventors involved in the present disclosure have identified the above problems in "ImageNet Classification with Deep Convolutional Neural Networks", "Multimodal Deep Learning for Robust RGB-D Object Recognition", and "A 256× 256 CMOS Image Sensor with 4E-Based Single-Shot Compressed Sensing" and examined techniques for improving classification speed. The inventors have then conceived the following techniques.

An image generation apparatus according to an aspect of the present disclosure includes a processing circuit and a memory storing at least one computational image. The at least one computational image is a light-field image, a compressive sensing image, or a coded image. The processing circuit (a1) identifies a position of an object in the at least one computational image using a classification device, (a2) generates, using the at least one computational image, a display image in which an indication for highlighting the position of the object is superimposed, and (a3) outputs the display image.

According to this aspect, a position of an object in a computational image is identified using the computational image. The identified position of the object is then highlighted in a display image. Since an object can be classified without recovering a recovery image from a computational image, processing speed improves. In addition, since an identified position of an object is highlighted in a display image, a user can easily recognize the position of the object. A display image in which an indication for highlighting a position of an object is superimposed using a computational image may be an image obtained by superimposing the indication upon the computational image or an image obtained by superimposing the indication upon an image other than the computational image. An example of the image other than the computational image may be a recovery image of the computational image or an image of a background having a solid color.

In the image generation apparatus according to the aspect of the present disclosure, the processing circuit may also (a4) perform recovery on the at least one computational image to generate a recovery image and, after identifying the position of the object in the at least one computational image in (a2), generate, using the latest recovery image, a display image in which the indication for highlighting the position of the object is superimposed.

According to this aspect, the display image can present latest information. For example, the display image can present information according to a current condition around the image generation apparatus.

In the image generation apparatus according to the aspect of the present disclosure, the processing circuit may simultaneously start (a1) and (a4).

According to this aspect, a delay in the whole process due to a delay in (a1) or (a4) can be suppressed. If either (a1) or (a4) requires processing time longer than the other, for example, a delay caused by (a1) or (a4), whichever requires longer processing time, can be suppressed by simultaneously starting (a1) and (a4).

In the image generation apparatus according to the aspect of the present disclosure, the processing circuit may also (a4) perform recovery on the at least one computational image to generate a recovery image, and generate, in (a2), a display image by superimposing the indication for highlighting the position of the object upon the recovery image. The processing circuit may perform (a1) at higher speed than for (a4).

According to this aspect, an identified position of an object is highlighted in a recovery image of a computational image. Because the recovery image includes an image in the same manner as the user visually recognizes an image, the user can easily recognize the position of the object and the object itself in a display image. In addition, since there is a difference in processing speed, a delay in displaying an indication for highlighting the position of the object relative to a display period of the recovery image can be suppressed.

In the image generation apparatus according to the aspect of the present disclosure, the at least one computational image may include first and second images. The first and second images may have been captured in this order. The processing circuit may identify, in (a1), a position of an object included in the first image and then identify a position of an object included in the second image, (a4) perform recovery on the first image to generate a first recovery image and then perform recovery on the second image to generate a second recovery image, and obtain, if the first recovery image is generated but the second recovery image is not generated within a first certain period of time after the position of the object included in the second image is identified in (a1), a first capture time, at which the first image has been captured, and a second capture time, at which the second image has been captured, calculate a difference between the first and second capture times, and, if the difference is equal to or smaller than a first threshold, generate a display image by superimposing the position of the object included in the second image upon the first recovery image and, if the difference is larger than the first threshold, determine the first recovery image as the display image without superimposing the position of the object included in the second image upon the first recovery image.

According to this aspect, a condition around an image capture unit that captures a computational image might have changed after the first certain period of time elapses. If a position of an object identified in a second image is superimposed upon a first recovery image or a second recovery image after the first certain period of time elapses, what is indicated by a display image and the condition around the image capture unit might be irrelevant to each other. If a difference between a time at which a first image has been captured and a time at which the second image has been captured is larger than a first threshold in this case, the irrelevance might become evident. If the difference between the time at which the first image has been captured and the time at which the second image has been captured is equal to or smaller than the first threshold, on the other hand, the irrelevance might be suppressed. A display image, therefore, can indicate a position of an object in real-time or substantially in real-time.

In the image generation apparatus according to the aspect of the present disclosure, an image capture unit that captures the at least one computational image may be provided on a mobile object. The processing circuit may obtain the at least one computational image from the image capture unit and store the at least one computational image in the memory, and obtain, if the first recovery image has been generated but the second recovery image has not been generated when the position of the object included in the first image has been identified in (a1), moving speed of the mobile object at a time when the first and second images have been obtained and sets the first certain period of time on the basis of the moving speed.

According to this aspect, a change in the condition around the image capture unit becomes larger after the first certain period of time elapses as the moving speed of the mobile object becomes higher. Since the first certain period of time is set on the basis of the moving speed, the change does not become significant due to the moving speed.

In the image generation apparatus according to the aspect of the present disclosure, if the moving speed is lower than a second threshold, the processing circuit need not change the first certain period of time, and if the moving speed is equal to or higher than the second threshold, the processing circuit may shorten the first certain period of time on the basis of the moving speed.

According to this aspect, since the first certain period of time is shortened if the moving speed of the mobile object is high, the condition around the image capture unit does not significantly change after the first period of time elapses. In other words, if the moving speed of the mobile object is high, a frequency at which whether to superimpose an image is determined on the basis of a difference between a time at which a first image has been obtained and a time at which a second image has been obtained increases. As a result, irrelevance between what is indicated by a display image upon which a position of an object included in a second image is superimposed and the condition around the image capture unit is suppressed in accordance with the moving speed of the mobile object.

In the image generation apparatus according to the aspect of the present disclosure, an image capture unit that captures the at least one computational image may be provided on a mobile object. The processing circuit may obtain the at least one computational image from the image capture unit and stores the at least one computation image in the memory, obtain moving speed of the mobile object, and generate, if the moving speed is equal to or lower than a third threshold, a display image in which the indication for highlighting the position of the object is superimposed in (a2) using the at least one computational image and generate, if the moving speed is higher than the third threshold, an image based on the at least one computational image in which the position of the object is not highlighted in (a2) as a display image.

According to this aspect, if the speed of the mobile object is high, the condition around the image capture unit might significantly change. As a result, the condition and what is indicated by a display image might become irrelevant to each other. If the moving speed of the mobile object is higher than the third threshold, an image based on a computational image is displayed. If the moving speed of the mobile object is equal to or lower than the third threshold, on the other hand, an image upon which an identified position of an object is superimposed is displayed. A display image, therefore, can indicate a position of an object in real-time or substantially in real-time.

In the image generation apparatus according to the aspect of the present disclosure, the processing circuit may also (a5) generate, in the at least one computational image, a partial recovery image corresponding to the identified position of the object, and generate, in (a2), the display image by superimposing the partial recovery image upon the at least one computational image.

According to this aspect, the amount of processing performed to generate a recovery image is suppressed, thereby improving processing speed. Furthermore, since a classification target is indicated in a recovery image, the user can easily recognize a position and a type of classification target.

A method for generating an image according to an aspect of the present disclosure includes (b1) obtaining, from a memory, at least one computational image, which is a light-field image, a compressive sensing image, or a coded image, (b2) identifying a position of an object in the at least one computational image using a classification device, (b3) generating, using the at least one computational image, a display image in which an indication for highlighting the position of the object is superimposed, and (b4) outputting the display image. A processor performs at least one of (b1) to (b4). According to this aspect, the same advantageous effects as those produced by the image generation apparatus according to the aspect of the present disclosure are produced.

The method according to the aspect of the present disclosure may further include (b5) performing recovery on the at least one computational image to generate a recovery image. After the position of the object in the at least one computational image is identified in (b3), a display image in which the indication for highlighting the position of the object is superimposed may be generated using the latest recovery image.

In the method according to the aspect of the present disclosure, (b2) and (b5) may simultaneously start.

The method according to the aspect of the present disclosure may further include (b5) performing recovery on the at least one computational image to generate a recovery image. In (b3), a display image may be generated by superimposing the indication for highlighting the position of the object upon the recovery image. Processing speed of (b2) may be higher than processing speed of (b5).

In the method according to the aspect of the present disclosure, the at least one computational image may include first and second images. The first and second images may have been captured in this order. In (b2), a position of an object included in the first image may be identified and then a position of an object included in the second image may be identified. The method may further include (b5) performing recovery on the first image to generate a first recovery image and then performing recovery on the second image to generate a second recovery image. If the first recovery image is generated but the second recovery image is not generated within a first certain period of time after the position of the object included in the second image is identified in (b2), a first capture time, at which the first image has been captured, and a second capture time, at which the second image has been captured, may be obtained, a difference between the first and second capture times may be calculated, and, if the difference is equal to or smaller than a first threshold, a display image may be generated by superimposing the position of the object included in the second image upon the first recovery image and, if the difference is larger than the first threshold, the first recovery image may be determined as the display image without superimposing the position of the object included in the second image upon the first recovery image.

In the method according to the aspect of the present disclosure, the at least one computational image may be an image captured from a mobile object. If the first recovery image has been generated but the second recovery image has not been generated when the position of the object included in the first image has been identified in (b2), moving speed of the mobile object at a time when the first and second images have been obtained may be obtained and the first certain period of time may be set on the basis of the moving speed.

In the method according to the aspect of the present disclosure, if the moving speed is lower than a second threshold, the period of the first threshold time need not be changed, and if the moving speed is equal to or higher than the second threshold, the period of the first threshold time may be shortened on the basis of the moving speed.

In the method according to the aspect of the present disclosure, the at least one computational image may be captured from a mobile object. The method may further include (b6) obtaining moving speed of the mobile object. If the moving speed is equal to or lower than a third threshold, a display image in which the indication for highlighting the position of the object is superimposed may be generated in (b3) using the at least one computational image, and if the moving speed is higher than the third threshold, an image based on the at least one computational image in which the position of the object is not highlighted may be generated in (b3) as a display image.

The method according to the aspect of the present disclosure may further include (b7) generating, in the at least one computational image, a partial recovery image corresponding to the identified position of the object. In (b3), the display image may be generated by superimposing the partial recovery image upon the at least one computational image.

It should be noted that the above general or specific aspects may be implemented as a system, an apparatus, a method, an integrated circuit, a computer program, a computer-readable storage medium such as a storage disc, or any selective combination thereof. The computer-readable storage medium may be a nonvolatile storage medium such as a CD-ROM.

Embodiment

An embodiment will be described hereinafter with reference to the drawings. The following embodiment is a general or specific example. Values, shapes, components, arrangement positions and connection modes of the components, steps, the order of the steps, and the like mentioned in the following embodiment are examples and do not limit the present disclosure. Among the components described in the following embodiment, ones not described in the independent claims, which define broadest concepts, will be described as optional components. In the following description of the embodiment, expressions including "substantially", such as "substantially parallel" and "substantially orthogonal", might be used. "Substantially parallel", for example, indicates not only exactly parallel but also essentially parallel, that is, inclusion of a difference of, say, several percent. The same holds for other expressions including "substantially". The drawings are schematic diagrams and not necessarily strict. In the drawings, substantially the same components are given the same reference numerals, and redundant description might be omitted or simplified.

An image generation apparatus according to the embodiment will be described. FIG. 1 is a schematic diagram illustrating an example of the functional configuration of a classification system 1 including an image generation apparatus 10 according to the embodiment. The classification system 1 includes the image generation apparatus 10 and an image capture unit 11. The image generation apparatus 10 includes an obtaining unit 101, a classification unit 102, an image output control unit 103, an image recovery unit 104, and an output unit 105. The classification system 1 detects subjects included in an image obtained by the image capture unit 11 and outputs a result of the detection. The detection of a subject in an image will also be referred to as "classification".

The classification system 1 may be provided on a mobile object such as a vehicle or a robot or may be provided on a stationary object such as a monitoring camera system. In the present embodiment, the classification system 1 is provided on an automobile, which is an example of a mobile object. In this case, the image capture unit 11 and the image generation apparatus 10 may be provided on the mobile object. Alternatively, the image capture unit 11 may be provided on the mobile object, and the image generation apparatus 10 may be provided outside the mobile object. The image generation apparatus 10 is provided in, for example, a computer, a terminal apparatus used by an operator of the mobile object, or the like. The terminal apparatus is, for example, an operation terminal apparatus dedicated for the mobile object or a general-purpose mobile terminal apparatus such as a smartphone, a smartwatch, or a tablet.

When the image generation apparatus 10 and the image capture unit 11 are separately provided, the image generation apparatus 10 and the image capture unit 11 may communicate with each other through wired communication or wireless communication. Wired communication may be, for example, a wired local area network (LAN) such as a network according to an Ethernet (registered trademark) standard or any other type of wired communication. Wireless communication may be achieved by a mobile communication standard employed by a mobile communication system, such as a third generation (3G) of mobile communication systems, a fourth generation (4G) of mobile communication systems, or Long-Term Evolution (LTE; registered trademark), a wireless LAN such as Wi-Fi (registered trademark) (wireless fidelity), or short-distance wireless communication such as Bluetooth (registered trademark) or ZigBee (registered trademark).

The image capture unit 11 captures, that is, obtains, computational images (computational imaging photography) including information regarding a surrounding environment, which is an imaging target. Computational images are also called computed images. For example, the image capture unit 11 obtains a computational image or obtains successive computational images as a video sequence in a first cycle, which is a certain cycle. The image capture unit 11 may obtain a computational image associated with time. Hardware of the image capture unit 11 is, for example, a light-field camera, a lensless camera, or a single-pixel camera. As described later, in the case of such a camera, the image capture unit 11 can simultaneously obtain images of subjects in one image capture operation. Alternatively, for example, the image capture unit 11 may obtain images in discrete image capture operations while changing imaging areas, that is, light receiving areas, of imaging devices included in the image capture unit 11. The image capture unit 11 outputs the obtained computational images to the obtaining unit 101 of the image generation apparatus 10.

Computational images and ordinary images will be described hereinafter. Ordinary images are images captured through an optical system. Ordinary images are usually obtained by focusing light from objects collected by an optical system (imaging). An example of the optical system is a lens. A relationship in which an object and an image point in an image can be switched to dispose the object at the image point and the image point at an original position of the object in the same optical system is called "conjugate". An image captured in a conjugate relationship will be referred to as an "ordinary image" herein. When a person directly sees an object in an environment where the object exists, the person perceives the object in substantially the same way as when he/she sees an ordinary image. In other words, a person visually recognizes an ordinary image captured by a common digital camera in the same way as he/she sees an object in an actual space.

A computational image, on the other hand, is an image that cannot be visually recognized by a person in the same way as in an actual space. That is, a computational image can be an image that cannot be visually recognized by a person, but information included in an image of a surrounding environment or the like can be obtained through computing. A computational image can be visualized through image recovery in such a way as to be recognized by a person. Examples of a computational image include a light-field image captured using multiple pinholes or microlenses, a compressive sensing image captured by weighting pixel information in space-time, and a coded image such as a coded aperture image captured using a coded aperture and a coded mask. In "A 256×256 CMOS Image Sensor with 4E-Based Single-Shot Compressed Sensing", for example, an example of the compressive sensing image is disclosed. Other examples of a computational image include images captured using a lensless camera that does not include an optical imaging system based on refraction disclosed in M. Salman Asif, Ali Ayremlou, Ashok Veeraraghavan, Richard Baraniuk, and Aswin Sankaranarayanan "FlatCam: Replacing Lenses with Masks and Computation", International Conference on Computer Vision Workshop (ICCVW), 2015, p. 663-666 and Yusuke Nakamura, Takeshi Shimano, Kazuyuki Tajima, Mayu Sao, and Taku Hoshizawa, "Lensless Light-field Imaging with Fresnel Zone Aperture", 3rd International Workshop on Image Sensors and Imaging Systems (IWISS2016) ITE-IST2016-51, 2016, No. 40, p. 7-8 and an image captured using a single-pixel camera disclosed in Michael Wakin, Jason Laska, Marco Duarte, Dror Baron, Shriram Sarvotham, Dharmpal Takhar, Kevin Kellyand, and Richard Baraniuk, "An Architecture for Compressive Imaging", 2006 IEEE International Conference on Image Processing (ICIP), 2006. These computational images are based on known techniques, and detailed description thereof is omitted.

A light-field image, for example, includes intensity and depth information in pixels thereof. A light-field image is obtained by imaging devices through pinholes or microlenses provided in front of the imaging devices. The pinholes or the microlenses are arranged in two dimensions, namely, for example, as a grid, along light-receiving surfaces of the imaging devices. The imaging devices simultaneously obtain an image through every pinhole or every microlens in one imaging operation. The images are captured from different viewpoints. A distance of a subject in a depth direction can be obtained on the basis of a positional relationship between the images and the viewpoints. Examples of the imaging devices include image sensors such as complementary metal-oxide-semiconductor (CMOS) image sensors and charge-coupled device (CCD) image sensors.

A compressive sensing image is obtained through compressive sensing. Examples of an image obtained through compressive sensing include an image captured by a lensless camera. A lensless camera does not include an optical imaging system based on refraction and obtains an image through a mask provided in front of imaging devices. The mask includes, as a grid, for example, areas whose transmittances (also called "aperture stops") are different from one another. By capturing an image through the mask, rays (light-field image) from various directions can be coded. In compressive sensing, an image based on a ray from a desired direction, an omnifocal image in which objects are in focus at all distances, and depth information can be obtained from the coded light-field image using mask information.

An image captured while providing such a mask at an aperture of a camera as a diaphragm is called a "coded aperture image".

The obtaining unit 101 of the image generation apparatus 10 obtains a computational image from the image capture unit 11 and outputs the computational image to the classification unit 102 and the image recovery unit 104. The obtaining unit 101 may obtain a classification device to be used by the classification unit 102 and output the obtained classification device to the classification unit 102. If the image generation apparatus 10 is provided on a mobile object, the obtaining unit 101 may obtain the speed of the mobile object from the mobile object. The obtaining unit 101 may obtain the speed of the mobile object in real-time or regularly. If the mobile object includes a speedometer, the obtaining unit 101 may obtain the speed from the speedometer or from a computer that is included in the mobile object and that receives speed information from the speedometer. If the mobile object does not include a speedometer, the obtaining unit 101 may obtain information regarding the speed from a global positioning system (GPS) device, an inertia measuring device such as an accelerometer or an angular velocity sensor, or the like included in the mobile object.

The classification unit 102 obtains a computational image from the obtaining unit 101. The classification unit 102 includes classification devices. The classification devices are classification models for obtaining information regarding targets from images. The classification devices are built through machine learning. By performing machine learning using computational images as learning data, classification devices having improved classification performance can be built. In the present embodiment, a machine learning model employed for the classification devices uses a neural network such as deep learning, but another learning model may be employed, instead. For example, the machine learning model may use random forests, genetic programming, or the like.

The classification unit 102 obtains information regarding an object in a computational image using a classification device. More specifically, the classification unit 102 classifies an object included in a computational image and obtains a position of the object in the computational image. That is, information regarding an object includes presence or absence of an object and a position of the object. A position of an object may include a planar position in an image and a position in a depth direction of the image. For example, the classification unit 102 identifies, using a classification device, whether an object is present for at least each of pixels of a computational image. The classification unit 102 obtains a position of at least one pixel at which presence of an object has been identified as a position of an object in a computational image. Classification of an object herein includes detection of a pixel of a computational image at which an object is present.

If the classification system 1 is provided on an automobile, for example, examples of an object include a person, another automobile, a bicycle, and a traffic signal. The classification unit 102 may identify a predetermined type of object using a computational image or may identify different types of object. Alternatively, the classification unit 102 may identify objects in units of categories such as mobile objects including people, automobiles, and bicycles. A classification device according to a type of object to be classified is used. The classification devices are stored, for example, in a memory included in the image generation apparatus 10.

A light-field image, for example, includes, at each pixel, depth information regarding a subject at the pixel in addition to a pixel value. As described in "Multimodal Deep Learning for Robust RGB-D Object Recognition", it is effective to use depth information regarding subjects for learning data in terms of improvement of classification performance of classification devices. Classification performance of classification devices built through machine learning employing light-field images, therefore, improves. Similarly, machine learning employing compressive sensing images and coded aperture images is effective in improving classification performance of classification devices.

Figure 2:
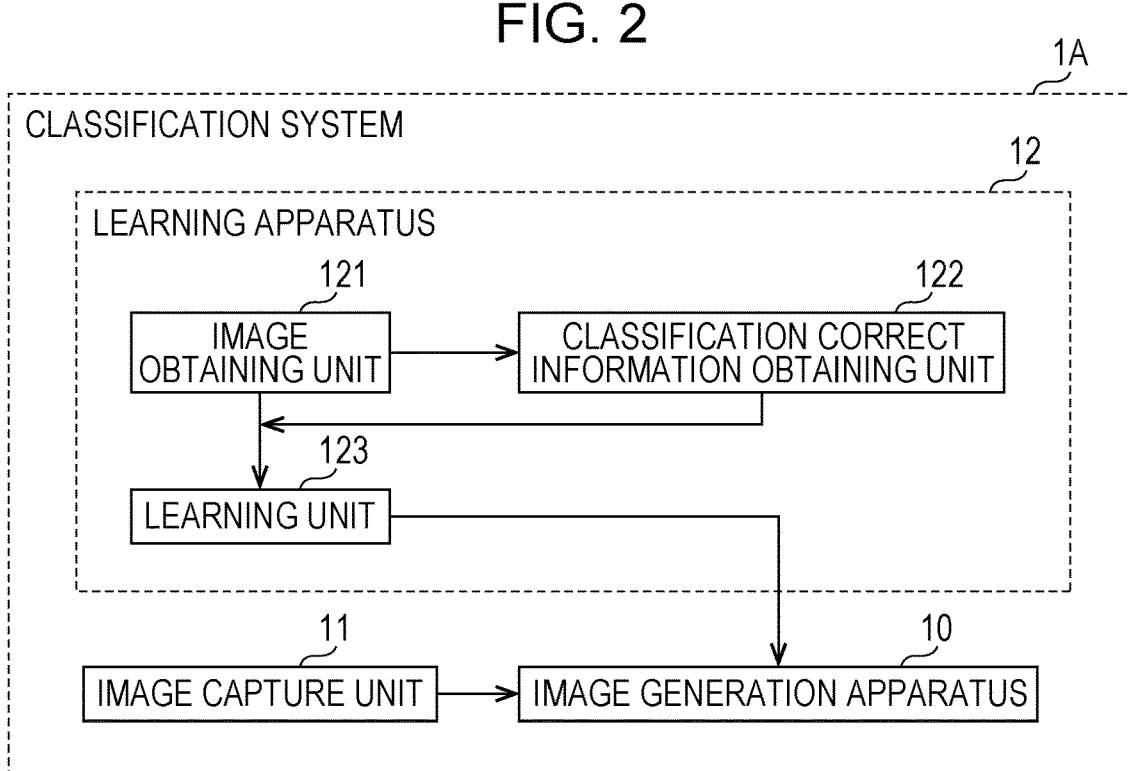
FIG. 2 is a schematic diagram illustrating an example of the functional configuration of a classification system according to a modification of the embodiment.

As illustrated in FIG. 2, the classification system 1 may include a learning apparatus 12 for generating classification devices. In this case, the classification unit 102 of the image generation apparatus 10 uses the classification devices generated by the learning apparatus 12. FIG. 2 is a schematic diagram illustrating an example of the functional configuration of a classification system 1A according to a modification of the embodiment.

The image output control unit 103 determines an image to be output from the output unit 105. More specifically, the image output control unit 103 determines whether to generate a recovery image using a computational image. The image output control unit 103 may determine whether to generate a recovery image for the entirety of a computational image, for each pixel of a computational image, or for a group of pixels of a computational image. A recovery image herein refers to an image in the same state as an ordinary image. A recovery image need not necessarily be an image that existed once and that has been generated again, but may be an image generated for the first time. For example, a computational image is captured without presence of an ordinary image. An image recovered from such a computational image is an image generated for the first time.

The image output control unit 103 may determine whether to generate a recovery image on the basis of a user's instruction or in accordance with a predetermined rule or cycle without the user's instruction. In the former case, for example, the classification system 1 includes an interface unit and receives the user's instruction with the interface unit. The image output control unit 103 may determine whether to generate a recovery image on the basis of an instruction from an external apparatus. At this time, the image output control unit 103 includes a communication unit such as a communication circuit and obtains an instruction from an external apparatus, with which the image output control unit 103 can communicate through wire or wirelessly, through the communication unit. The interface unit is, for example, a button, a lever, a key, a touch panel, a mouse, a microphone for recognizing sound, or the like. As described later, the image output control unit 103 may switch image information to be output on the basis of a result of classification performed by the classification unit 102.

The image recovery unit 104 recovers a computational image obtained by the image capture unit 11 on the basis of a determination made by the image output control unit 103 to generate a recovery image. If the image output control unit 103 determines that a recovery image is not to be generated, the image recovery unit 104 does not generate a recovery image.

The output unit 105 outputs image information. The image information includes at least either a recovery image or a computational image for which it has been determined that a recovery image is not to be generated. If the classification system 1 further includes a display, the output unit 105 outputs, to the display, an instruction to output image information. Alternatively, the output unit 105 includes a communication unit and outputs image information to a control unit of an external apparatus including a display through the communication unit through wire or wirelessly. The communication unit may be the same as that of the image output control unit 103. The output unit 105 may obtain information regarding an object from the classification unit 102 and output image information to which the information regarding the object has been added. As described above, the information regarding the object includes presence or absence of an object and a position of the object.

The components of the image generation apparatus 10, namely the obtaining unit 101, the classification unit 102, the image output control unit 103, the image recovery unit 104, and the output unit 105, may be configured by a processing circuit including a processor such as a central processing unit (CPU) or a digital signal processor (DSP) and a memory such as a random-access memory (RAM) and a read-only memory (ROM). Functions of some or all of the components may be achieved when the CPU or the DSP has executed a program stored in the ROM using the RAM as a working memory. Alternatively, functions of some or all of the components may be achieved by a dedicated hardware circuit such as an electronic circuit or an integrated circuit. Functions of some or all of the components may be achieved by a combination of the above-described software function and the hardware circuit.

Next, a case where a classification system includes a learning apparatus, that is, a modification of the classification system 1 according to the embodiment, will be described. As illustrated in FIG. 2, the classification system 1A according to the modification includes the image generation apparatus 10, the image capture unit 11, and the learning apparatus 12. The learning apparatus 12 includes an image obtaining unit 121, a classification correct information obtaining unit 122, and a learning unit 123. The image generation apparatus 10, the image capture unit 11, and the learning apparatus 12 may be provided on a single apparatus, or may be provided on discrete apparatuses. If the image generation apparatus 10, the image capture unit 11, and the learning apparatus 12 are provided on discrete apparatuses, the image generation apparatus 10, the image capture unit 11, and the learning apparatus 12 may communicate information through wired communication or wireless communication. Wired communication or wireless communication to be employed may be any of the above-described types of communication.

Figure 3:
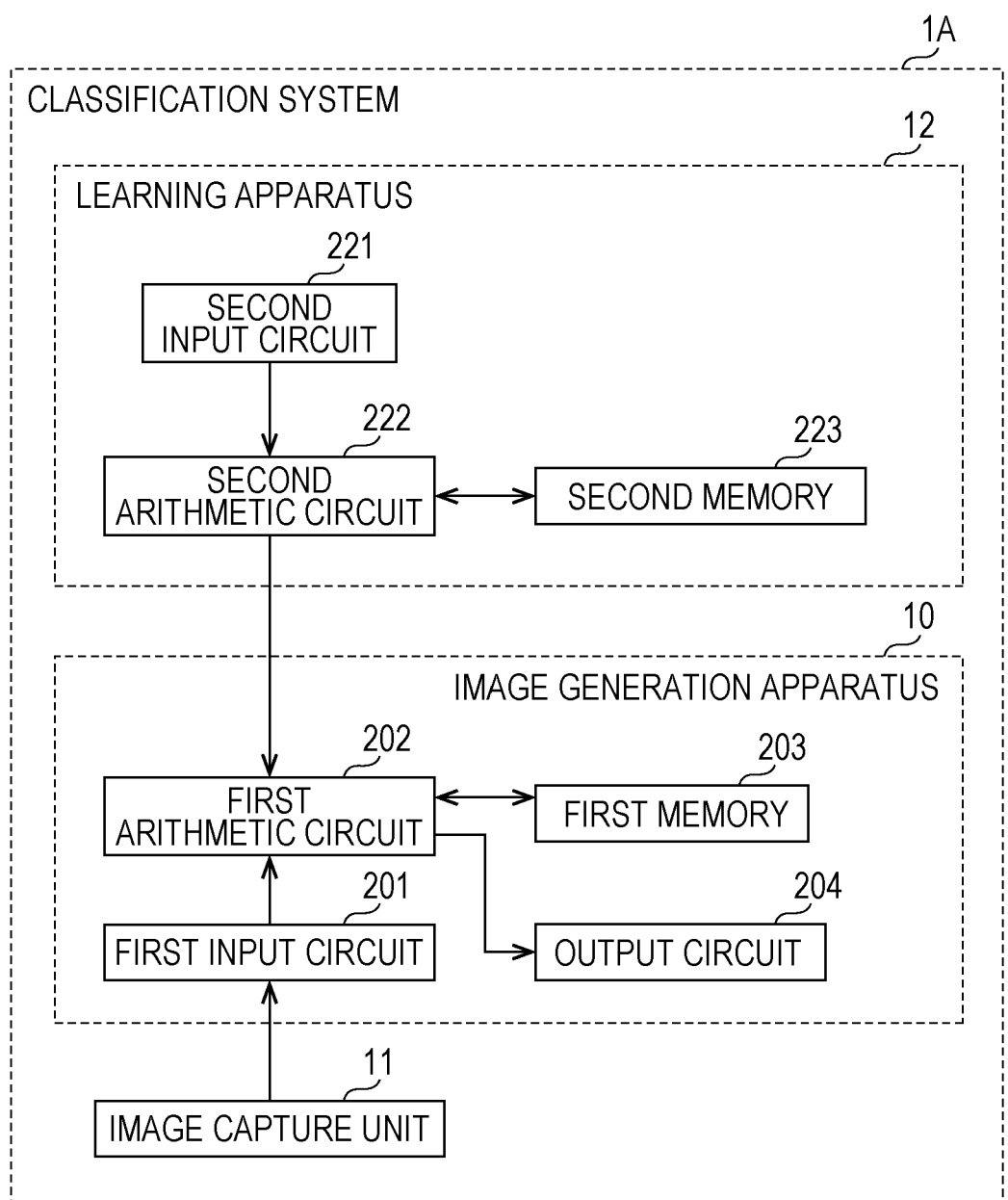
FIG. 3 is a schematic diagram illustrating an example of the hardware configuration of the classification system according to the modification.

FIG. 3 is a schematic diagram illustrating an example of the hardware configuration of the classification system 1A according to the modification. As illustrated in FIG. 3, the learning apparatus 12 includes a second input circuit 221, a second arithmetic circuit 222, and a second memory 223. The image generation apparatus 10 includes a first input circuit 201, a first arithmetic circuit 202, a first memory 203, and an output circuit 204.

In FIGS. 1 and 3, the first input circuit 201 corresponds to the obtaining unit 101. The first arithmetic circuit 202 corresponds to the classification unit 102, the image output control unit 103, and the image recovery unit 104. The output circuit 204 corresponds to the output unit 105. The first memory 203 stores, that is, records, computer programs for the first input circuit 201, the first arithmetic circuit 202, and the output circuit 204 to perform processes, at least one computational image obtained by the obtaining unit 101, a classification device to be used by the classification unit 102, and the like. The first memory 203 may be a single memory or may be a group of memories of the same type or different types. The first input circuit 201 and the output circuit 204 may include a communication circuit.

In FIGS. 2 and 3, the second input circuit 221 corresponds to the image obtaining unit 121. The second input circuit 221 may include a communication circuit. The second arithmetic circuit 222 corresponds to the classification correct information obtaining unit 122 and the learning unit 123. The second memory 223 stores, that is, records, computer programs for the second input circuit 221 and the second arithmetic circuit 222 to perform processes, at least one computational image obtained by the image obtaining unit 121, classification correct information obtained by the classification correct information obtaining unit 122, the classification devices generated by the learning unit 123, and the like. The second memory 223 may be a single memory or may be a group of memories of the same type or different types.

The first input circuit 201, the first arithmetic circuit 202, the output circuit 204, the second input circuit 221, and the second arithmetic circuit 222 may be configured by a processing circuit including a processor such as a CPU or a DSP. The first memory 203 and the second memory 223 are each achieved, for example, by a semiconductor memory such as a ROM, a RAM, or a flash memory, a hard disk drive, or a storage device such as a solid-state drive (SSD). The first memory 203 and the second memory 223 may be integrated together as a single memory. The processor executes commands described in a computer program loaded onto the memory. As a result, the processor achieves various functions.

The image obtaining unit 121 of the learning apparatus 12 obtains a computational image for machine learning. The image obtaining unit 121 may obtain the computational image from the image capture unit 11 or from outside the classification system 1A through wired communication or wireless communication. Wired communication or wireless communication to be employed may be any of the above-described types of communication. The image obtaining unit 121 stores the obtained computational image in the second memory 223.

The classification correct information obtaining unit 122 obtains classification correct information for machine learning employing the computational image obtained by the image obtaining unit 121. The classification correct information may be provided from outside the classification system 1A or input by the user for the computational image captured by the image capture unit 11. The classification correct information includes information regarding categories to which subjects included in the computational image belong and positional information regarding the subjects. Categories of subjects are, for example, persons, automobiles, bicycles, traffic signals, and the like. The positional information need not necessarily be positions in an image, but, as described later, may be positions in virtual images at depth positions of the subjects. The classification correct information obtaining unit 122 stores the obtained classification correct information in the second memory 223 while associating the classification correct information with the computational image.

The learning unit 123 performs learning for a classification device of the classification unit 102 using the computational image obtained by the image obtaining unit 121 and the classification correct information obtained by the classification correct information obtaining unit 122. The learning unit 123 subjects the classification device stored in the second memory 223 to machine learning and stores the latest classification device after the learning in the second memory 223. The classification unit 102 obtains the latest classification device stored in the second memory 223, stores the classification device in the first memory 203, and uses the classification device for classification. The machine learning is achieved, for example, through backpropagation in deep learning or the like. More specifically, the learning unit 123 inputs the computational image to the classification device and obtains a result of classification output from the classification device. The learning unit 123 then adjusts the classification device such that the result of classification becomes the classification correct information. The learning unit 123 repeats such an adjustment to improve classification accuracy of the classification device.

Next, the operation of the learning apparatus 12 will be described with reference to FIGS. 2 to 4. FIG. 4 is a flowchart illustrating an example of a main process performed by the learning apparatus 12. First, in step S1, the image obtaining unit 121 obtains a computational image. In the following description, it is assumed that the computational image is a light-field image.

The light-field image includes, at each pixel, both intensity and depth information. The light-field image is obtained by a light-field camera. A specific example of the light-field camera is a camera including multiple pinholes or microlenses. The image capture unit 11 may be a light-field camera, and the image obtaining unit 121 may obtain a light-field image captured by the image capture unit 11. Alternatively, the image obtaining unit 121 may obtain a light-field image from outside the classification system 1A through wired communication or wireless communication.

FIG. 5 illustrates an example of a light-field camera including multiple pinholes. A light-field camera 211 illustrated in FIG. 5 includes a multiple pinhole mask 211a and an image sensor 211b. The multiple pinhole mask 211a is provided at a certain distance away from the image sensor 211b. The multiple pinhole mask 211a includes pinholes 211aa arranged at random or regular intervals. The pinholes 211aa will also be referred to as "multiple pinholes". The image sensor 211b obtains images of a subject through the pinholes 211aa. The image obtained through each pinhole will be referred to as a "pinhole image". The pinhole images of the subject differ from one another in accordance with positions and sizes of the pinholes 211aa, and the image sensor 211b obtains a superimposition image of the pinhole images. The positions of the pinholes 211aa affect a position of the subject projected onto the image sensor 211b, and the sizes of the pinholes 211aa affect the blurriness of the pinhole images. By using the multiple pinhole mask 211a, pinhole images whose positions and degrees of blurriness are different from one another can be obtained and superimposed upon one another. If the subject is far from the pinholes 211aa, the subject on each pinhole images is projected onto substantially the same position. If the subject is near the pinholes 211aa, on the other hand, the subject on each pinhole image is projected at a distant position. For this reason, the superimposition image includes depth information regarding the subject.

Figure 6:
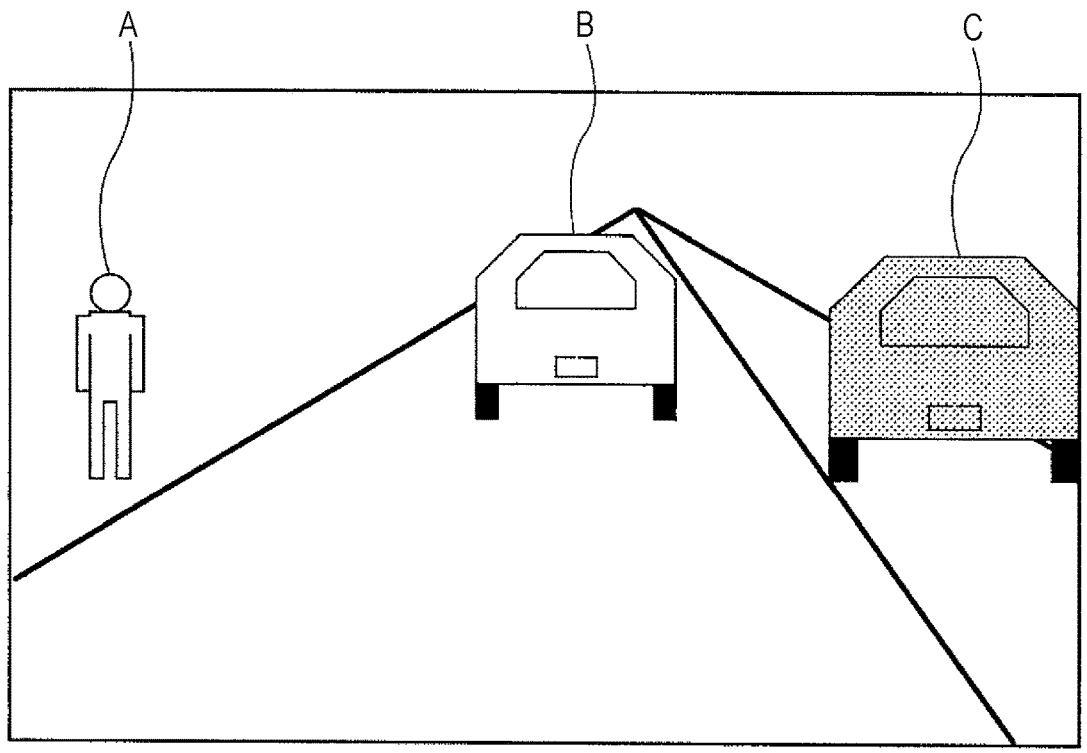
FIG. 6 is a schematic diagram illustrating an example of an image of subjects captured in an ordinary manner.
Figure 7:
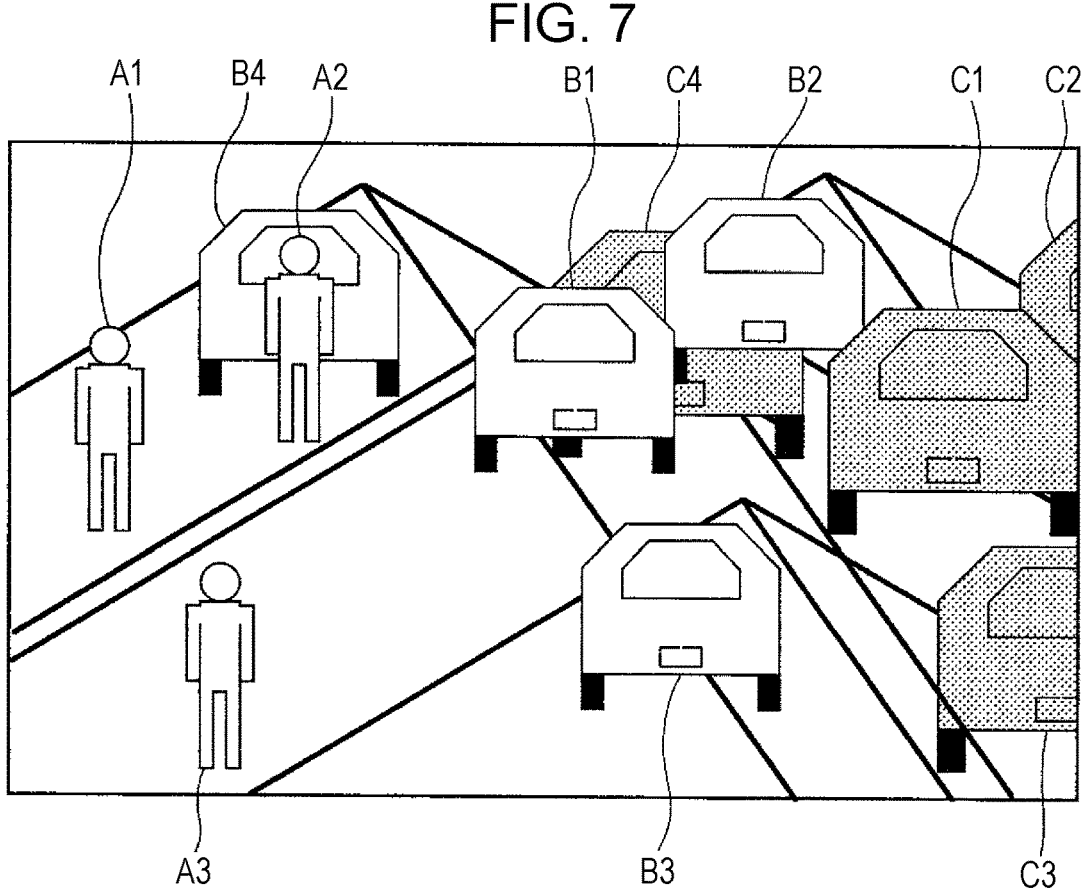
FIG. 7 is a schematic diagram illustrating an example of an image of the subjects illustrated in FIG. 6 captured using a light-field camera including a multiple pinhole mask.

For example, FIGS. 6 and 7 illustrate an example of an ordinary image and a light-field image obtained by a light-field camera including multiple pinholes, respectively. FIG. 6 illustrates an example of an image of subjects captured in an ordinary manner, and FIG. 7 illustrates an example of an image of the subjects illustrated in FIG. 6 captured using the light-field camera including a multiple pinhole mask. As illustrated in FIG. 6, a person A and automobiles B and C are included in the ordinary image as subjects. If images of these subjects are captured by a light-field camera including four pinholes, for example, images of the person A and the automobiles B and C are obtained as superimposed images as illustrated in FIG. 7. More specifically, images of the person A are obtained as persons A1, A2, and A3. Images of the automobile B are obtained as automobiles B1, B2, B3, and B4. Images of the automobile C are obtained as automobiles C1, C2, C3, and C4.

In step S2, the classification correct information obtaining unit 122 generates, from the light-field image, virtual focus position images while varying the focal points. At this time, the classification correct information obtaining unit 122 uses the positions and sizes of the pinholes 211aa of the multiple pinhole mask 211a, camera parameters of the light-field camera, information regarding the image sensor, and a technique of ray tracing. A virtual focus position image is an image in which a position corresponding to a set depth value is in focus and subjects located at other depth values are out of focus and look blurry. By generating virtual focus position images whose focal positions are different from one another, depth values of subjects can be obtained. The technique of ray tracing is one of methods for drawing three-dimensional computer graphics, and determines a color of each pixel in an intermediate drawing plane by tracing rays incident on the pixel, which is a visual point, back to the subjects.

In step S3, the classification correct information obtaining unit 122 obtains classification correct information regarding the light-field image. The classification correct information includes information regarding categories to which subjects belong, namely people, automobiles, bicycles, traffic signals, and the like and planar positions and areas of the subjects in the image. The classification correct information is given from outside the classification system 1A along with the light-field image or given from the user for the light-field image obtained by the image capture unit 11. The classification correct information obtaining unit 122 classifies the subjects in each virtual focus position image on the basis of the positions of the subjects and associates the classified subjects with categories. As a result, the classification correct information obtaining unit 122 associates the areas of the subjects, the categories of the subjects, positional information including the planar positions and depth positions of the subjects with one another and uses these pieces of information as the classification correct information.

Figure 8A:
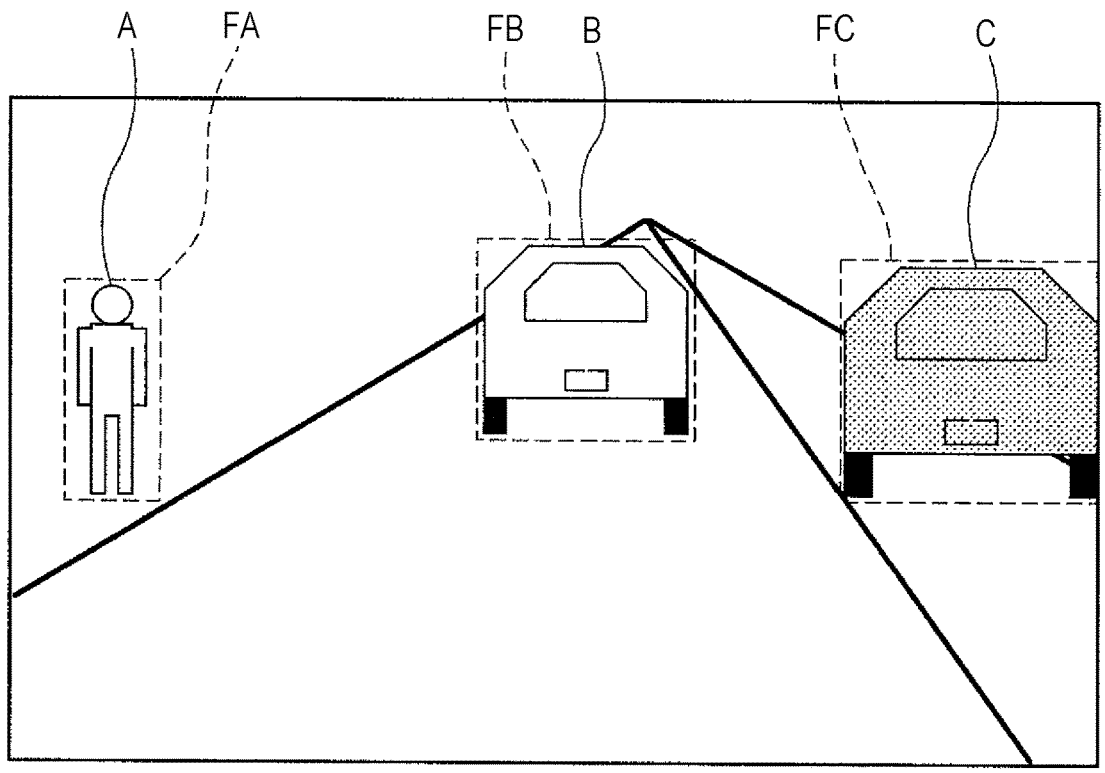
FIG. 8A is a schematic diagram illustrating classification bounding boxes superimposed upon the ordinary image.
Figure 8B:
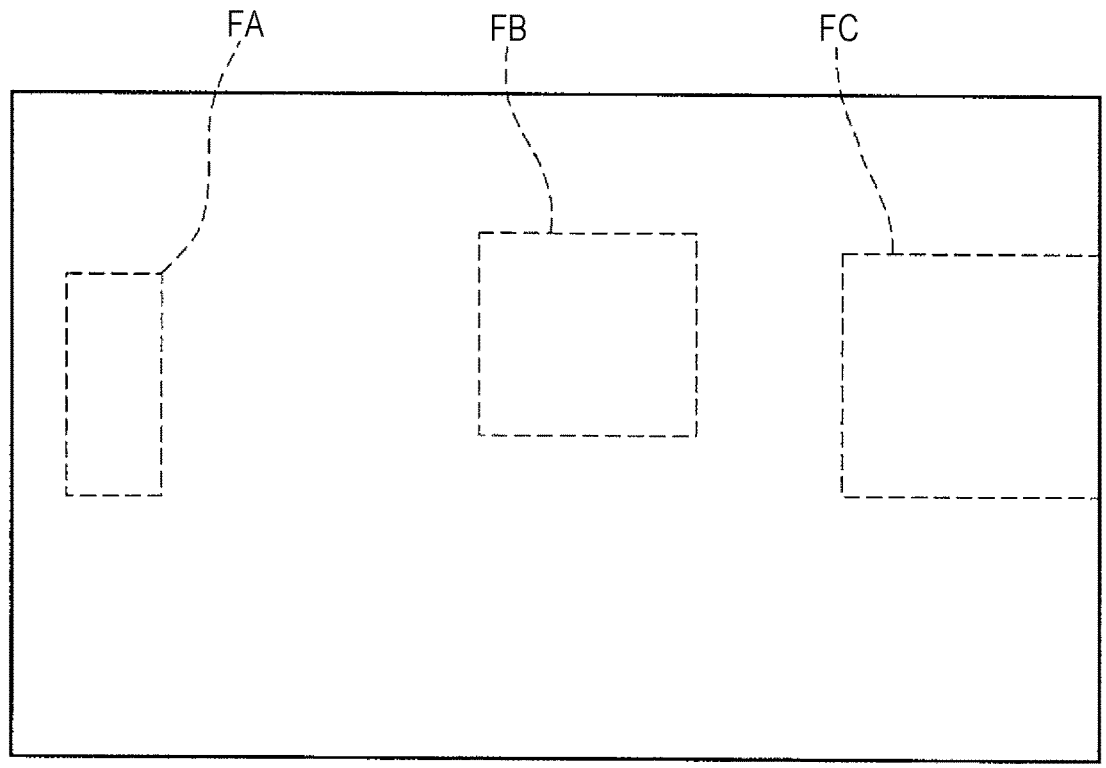
FIG. 8B is a schematic diagram illustrating the classification bounding boxes.

When determining the planar positions and areas of the subjects in the image, the classification correct information obtaining unit 122 uses indicators. For example, the classification correct information obtaining unit 122 uses frames surrounding the subjects as the indicators. The bounding box surrounding the subjects will be referred to as "classification bounding boxes" hereinafter. The classification bounding boxes highlight the positions and areas of the subjects. FIGS. 8A and 8B illustrate an example of the classification bounding boxes. FIG. 8A is a schematic diagram illustrating classification bounding boxes superimposed upon the ordinary image. FIG. 8B is a schematic diagram illustrating the classification bounding boxes. In the example illustrated in FIGS. 8A and 8B, the classification correct information obtaining unit 122 sets rectangular classification bounding boxes surrounding and circumscribing the subjects. Shapes of classification bounding boxes are not limited to that in the example illustrated in FIGS. 8A and 8B.

In FIGS. 8A and 8B, for example, the classification correct information obtaining unit 122 sets classification bounding boxes FA, FB, and FC for the person A, the automobile B, and the automobile C, respectively. At this time, the classification correct information obtaining unit 122 may calculate, as information indicating shapes and positions of the classification bounding boxes, lines and coordinates of all the classification bounding boxes, coordinates of vertices of the classification bounding boxes, or coordinates of upper-left vertices and the length of sides of the classification bounding boxes. In addition, as illustrated in FIGS. 8A and 8B, the classification correct information obtaining unit 122 may set classification bounding boxes of the same line type for subjects of any category or change a line type of each classification bounding box depending on the category. The classification correct information obtaining unit 122 may include the line types of the classification bounding boxes in information regarding the classification bounding boxes. In doing so, the classification correct information obtaining unit 122 outputs, as classification correct information, information including the planar positions, depth positions, and shapes of the areas of the classification bounding boxes.

Figure 9:
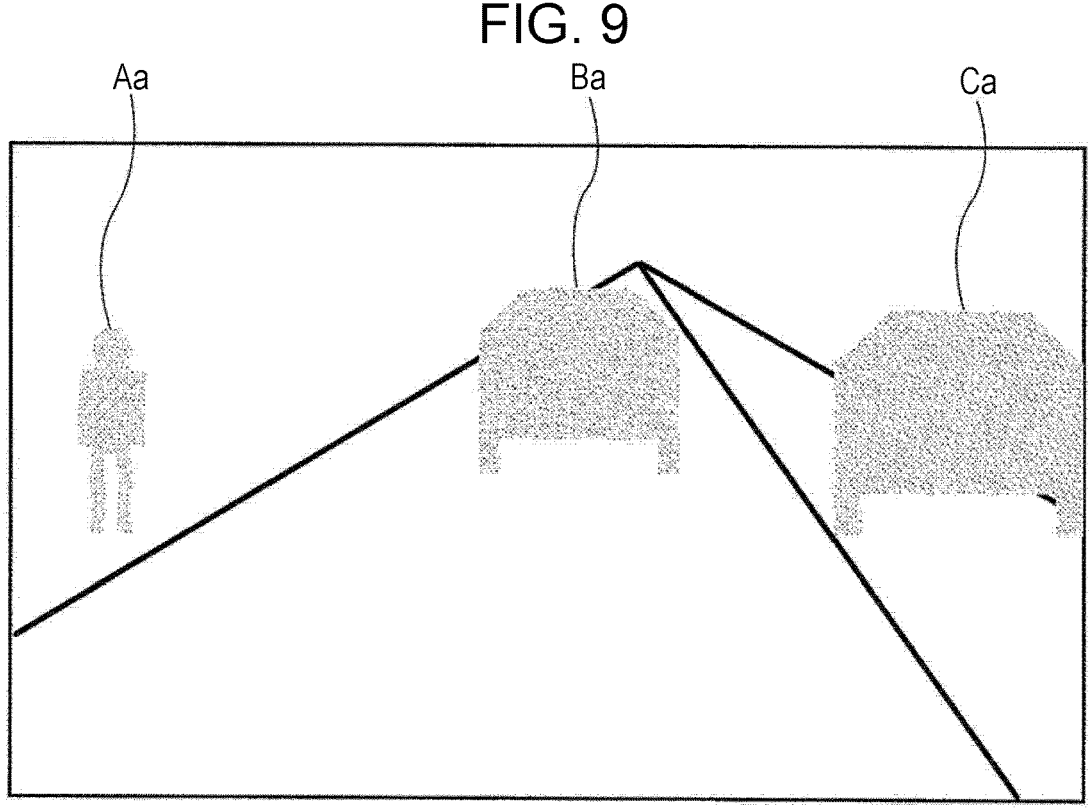
FIG. 9 is a schematic diagram illustrating an example of classification correct information provided on the image as a mask.

The classification correct information obtaining unit 122 may obtain classification correct information for each pixel, instead of obtaining information regarding the classification bounding boxes as classification correct information. The classification correct information for each pixel may be provided, for example, on the image as a mask. For example, FIG. 9 schematically illustrates an example of the classification correct information provided on the image as a mask. In the example illustrated in FIG. 9, masks Aa, Ba, and Ca are provided for the person A, the automobile B, and the automobile C, respectively, as classification correct information. As a result, the classification correct information obtaining unit 122 outputs classification correct information for each pixel.

In step S4, the learning unit 123 obtains the light-field image obtained in step S1 and the classification correct information for the virtual focus position images obtained in step S3. The learning unit 123 also obtains a classification device stored in the second memory 223 and inputs the light-field image to the classification device to obtain an output result. The learning unit 123 adjusts the classification device such that the output result becomes the classification correct information and stores the adjusted classification device to update the classification device stored in the second memory 223.

Figure 10:
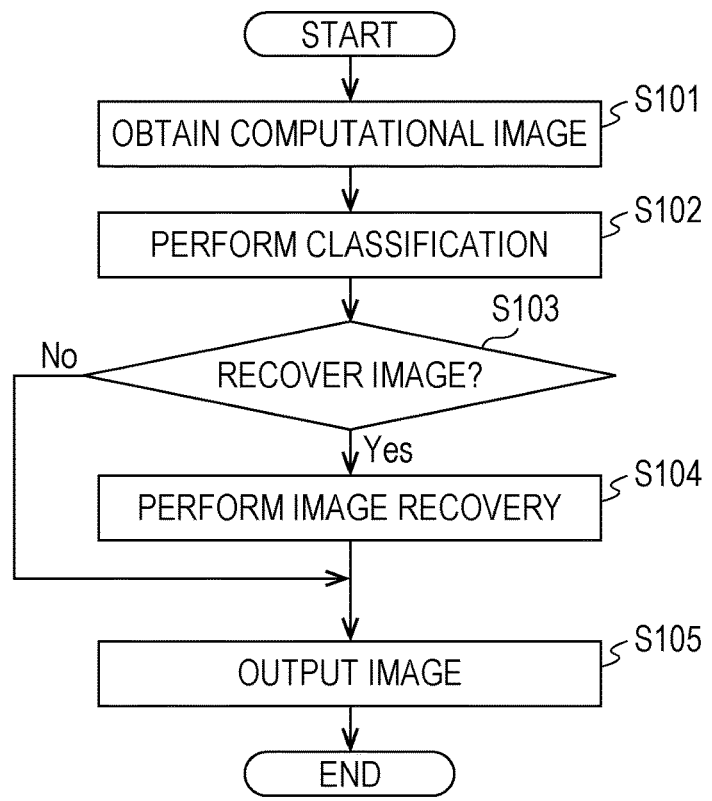
FIG. 10 is a flowchart illustrating an example of the operation of the image generation apparatus according to the embodiment.

Next, the operation of the image generation apparatus 10 will be described with reference to FIGS. 1 and 10. FIG. 10 is a flowchart illustrating an example of the operation of the image generation apparatus 10 according to the embodiment. In the following description, it is assumed that the image capture unit 11 is a light-field camera.

In step S101, the image capture unit 11 captures an image. For example, the image capture unit 11 obtains a light-field image as a computational image in a first cycle, which is a certain cycle. The obtaining unit 101 obtains the light-field image captured by the image capture unit 11 and outputs the light-field image to the classification unit 102. The obtaining unit 101 may obtain a light-field image from outside the classification system 1, instead.

Next, in step S102, the classification unit 102 detects objects to be classified in the light-field image using a classification device. Objects to be classified may be set in the classification device in advance. If the classification system 1 is provided on an automobile, for example, examples of the objects to be classified include people, automobiles, bicycles, and traffic signals. By inputting the light-field image to the classification device, the classification unit 102 obtains a result of detection of objects to be classified from the classification device as an output result. The classification unit 102 may store the light-field image subjected to the classification in the first memory 203 (refer to FIG. 3).

Next, in step S103, the image output control unit 103 determines whether to perform image recovery on the light-field image subjected to the classification performed by the classification unit 102. If so (YES in step S103), the image output control unit 103 proceeds to step S104, and if not (NO in step S103), the image output control unit 103 proceeds to step S105. If the classification unit 102 has detected objects to be classified, the image output control unit 103 may determine that image recovery is to be performed. In this case, the image output control unit 103 may perform image recovery on the entirety of the light-field image in which the classification unit 102 has detected objects to be classified, a part of the light-field image, or one of a certain number of light-field images. Alternatively, the image output control unit 103 may perform image recovery on light-field images obtained at certain time intervals. The image output control unit 103 may receive a user instruction or an instruction from an external apparatus and perform image recovery. In this case, the image output control unit 103 may perform image recovery on a light-field image captured at a time of the reception of the instruction.

In step S104, the image recovery unit 104 obtains information regarding the light-field image to be subjected to image recovery and obtains the light-field image on the basis of the information. The image recovery unit 104 obtains the light-field image from, for example, the first memory 203. The image recovery unit 104 generates a recovery image by performing image recovery on the obtained light-field image.

In step S105, the output unit 105 outputs image information. If the image recovery unit 104 has performed image recovery, the output unit 105 outputs image information including the recovery image and the light-field image, or at least the recovery image. If the image recovery unit 104 has not performed image recovery, the output unit 105 outputs image information that includes or does not include the light-field image. The image information that includes at least the recovery image may include information regarding the objects detected by the classification unit 102. The information regarding the objects includes positions and areas of the objects. The output unit 105 may output the image information to at least either the display included in the classification system 1 or an external apparatus.

The classification performed in step S102 illustrated in FIG. 10 will be described. Image information and depth information can be simultaneously obtained from the light-field image captured by the image capture unit 11, which is a light-field camera. The classification unit 102 performs classification on the light-field image using a classification device subjected to learning performed by the learning apparatus 12. The learning is achieved through machine learning employing a neural network such as deep learning.

Figure 11:
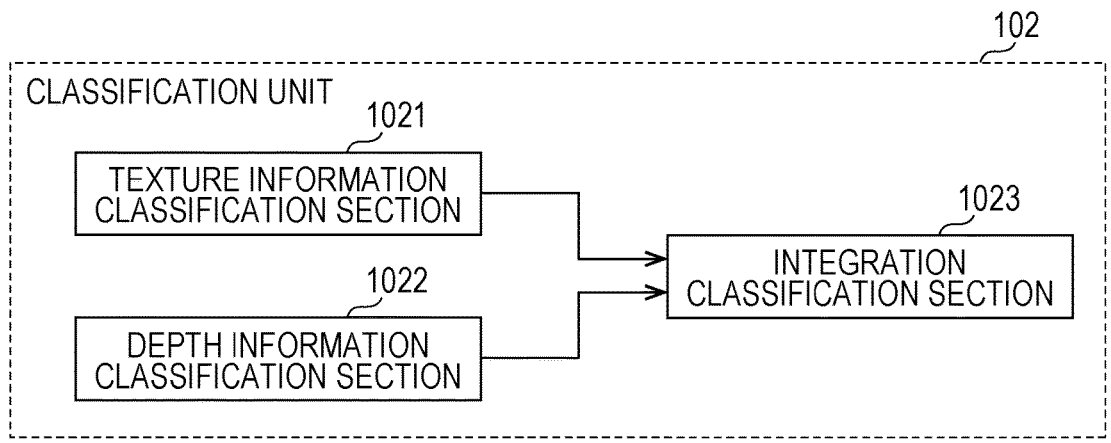
FIG. 11 is a schematic diagram illustrating an example of the functional configuration of a classification unit.

The classification unit 102 may identify texture information and depth information and collectively identify objects included in an image using the identified texture information and depth information. As illustrated in FIG. 11, the classification unit 102 includes a texture information classification section 1021, a depth information classification section 1022, and an integration classification section 1023. The texture information classification section 1021 and the depth information classification section 1022 are connected in parallel with the integration classification section 1023. FIG. 11 is a schematic diagram illustrating an example of the functional configuration of the classification unit 102.

The texture information classification section 1021 detects subjects in a light-field image using texture information. More specifically, the texture information classification section 1021 identifies areas and categories of subjects in a light-field image using a neural network such as one described in "ImageNet Classification with Deep Convolutional Neural Networks", for example, as a classification device. Information input to the texture information classification section 1021 is a light-field image, and a result of classification performed by the texture information classification section 1021 is, as in the case of the learning apparatus 12, areas and categories of subjects in a virtual focus position image. In the case of an ordinary image, values in directions of incident rays, that is, depth information, are integrated and included in pixel values, and depth information is not present. Compared to such an ordinary image, a light-field image includes a lot of information regarding subjects. When a light-field image obtained using multiple pinholes or the like is used as information input to a classification device, therefore, more accurate classification than when an ordinary image is used as input information can be performed.

The depth information classification section 1022 detects depth information regarding subjects from a light-field image. More specifically, the depth information classification section 1022 obtains depth information regarding subjects based on a virtual focus position image as in the case of the learning apparatus 12. Depth information based on a virtual focus position image can be obtained using the technique of ray tracing, and a classification device used by the depth information classification section 1022 can be achieved as a full connected layer of a neural network. It is needless to say that the depth information classification section 1022 may be generated by learning depth images obtained separately as correct images.

The integration classification section 1023 integrates a result of classification performed by the texture information classification section 1021 and a result of classification performed by the depth information classification section 1022 and outputs a final result of classification. The final result of classification includes areas of objects included in a light-field image, planar positions of the areas in the image, and depth positions of the areas. A classification device used by the integration classification section 1023 can be achieved as a full connected layer of a neural network.

Figure 12:
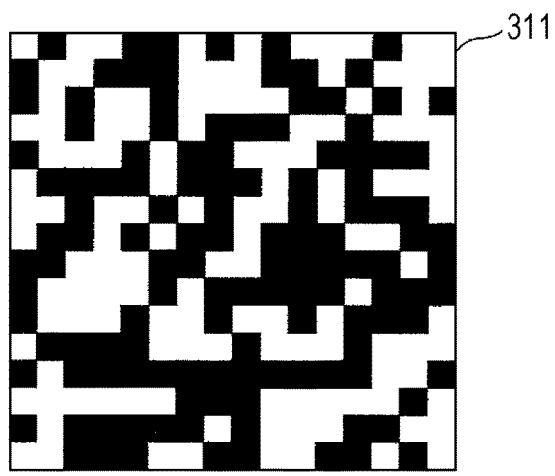
FIG. 12 is a schematic diagram illustrating an example of a coded aperture mask in which a random mask is used as a coded aperture.

Although the image capture unit 11 is a light-field camera including multiple pinholes or microlenses in the above description, a type of image capture unit 11 is not limited to this. For example, the image capture unit 11 may capture a coded aperture image. FIG. 12 is a schematic diagram illustrating an example of a coded aperture mask in which a random mask is used as a coded aperture. As illustrated in FIG. 12, a coded aperture mask 311 includes light transmission areas indicated by white areas and light blocking areas indicated by black areas. The coded aperture mask 311 is fabricated by vapor-depositing chromium upon a sheet of glass. When the coded aperture mask 311 is provided in an optical path between a main lens and an image sensor, a part of rays is blocked, and a camera that captures a coded aperture image can be achieved.

Figure 13:
FIG. 13 is a schematic diagram illustrating another example of the functional configuration of the classification unit.

The classification unit 102 need not necessarily include the texture information classification section 1021 and the depth information classification section 1022 connected in parallel with each other but may be configured such that the texture information classification section 1021 performs classification after the depth information classification section 1022 extracts depth information, instead. FIG. 13 is a schematic diagram illustrating another example of the functional configuration of the classification unit 102. As illustrated in FIG. 13, in the classification unit 102, the depth information classification section 1022, the texture information classification section 1021, and the integration classification section 1023 are connected in series with each other. The depth information classification section 1022 generates a virtual focus position image for each of positions corresponding to depth values. The texture information classification section 1021 receives the virtual focus position images corresponding to depth values generated by the depth information classification section 1022 as input information and identifies positions, areas, and categories of subjects using a neural network such as that described in "ImageNet Classification with Deep Convolutional Neural Networks".

The integration classification section 1023 integrates results of classification of categories performed by the texture information classification section 1021 and outputs the integrated results. In the integration, for example, a logical sum of results of classification, which are outputs of the texture information classification section 1021, may be obtained. It is needless to say that not a logical sum but the same result of classification output repeatedly for different depth values, for example, may be selected as an output result in the integration.

Since the virtual focus position images corresponding to the depth values include depth information in addition to texture information, the classification unit 102 can achieve classification employing not only the texture information but also the depth information. As a result, the classification unit 102 can perform accurate classification.

If the classification unit 102 performs classification using texture information after extracting depth information, the learning unit 123 may perform learning using a virtual focus position image corresponding to each depth value. In doing so, classification can be performed for each depth value, and more accurate classification becomes possible.

In addition, the classification unit 102 may change the configuration of the neural network thereof in accordance with the image capture unit 11. If the image capture unit 11 is a light-field camera, virtual focus position images are generated using positions and sizes of multiple pinholes of the image capture unit 11 and the like. If positions and sizes of multiple pinholes are different between classification units, classification accuracy of the classification unit 102 can be improved by configuring a neural network for each image capture unit. Information regarding the positions and sizes of the multiple pinholes can be obtained by performing camera calibration in advance.

As described above, the classification unit 102 receives a light-field image as input information and performs classification using texture information and depth information regarding the light-field image. As a result, the classification unit 102 can perform more accurate classification than classification based on a texture image in which a conventional ordinary image is used.

The classification system 1 including the image generation apparatus 10 that includes the classification unit 102 and the classification system 1A including the image generation apparatus 10 and the learning apparatus 12 have been described above as classification systems. The classification unit 102, however, may include the learning apparatus 12, and in this case, the classification system 1 includes the learning apparatus 12.

As described above, in the classification systems 1 and 1A according to the embodiment and the modification, respectively, the image generation apparatus 10 uses a computational image such as a light-field image and classifies subjects in the image. In addition, the image generation apparatus 10 does not recover an ordinary image from a computational image in a classification process but performs the image recovery after the classification process as necessary upon a request from the user. The image generation apparatus 10 classifies subjects in a computational image on the basis of texture information included in the computational image and depth information included in virtual focus position images calculated from the computational image. The image generation apparatus 10, therefore, can reduce the amount of processing performed to identify subjects. In particular, the image generation apparatus 10 can significantly increase classification speed compared to when an ordinary image is recovered from a computational image during classification.

In addition, the image generation apparatus 10 uses not an ordinary image but a computational image having a large amount of information, such as a light-field image, as input information used for classification. The image generation apparatus 10, therefore, can perform classification employing not only texture information regarding an image but also depth information regarding subjects and achieves accurate classification. Furthermore, the learning apparatus 12 that generates classification devices performs learning for the classification devices using computational images as learning data, and generation of accurate classification devices becomes possible. Furthermore, since the image capture unit 11 that captures computational images does not require a rangefinder for obtaining depth information, the classification systems 1 and 1A achieve accurate classification at low cost. When the image capture unit 11 is a light-field camera including multiple pinholes, in particular, the classification systems 1 and 1A further reduce cost.

Next, the process performed by the image recovery unit 104 will be described in more detail hereinafter. The image recovery unit 104 recovers, in accordance with a result of processing performed by the image output control unit 103, an ordinary image that can be recognized by a person, who is the user, from a computational image obtained by the image capture unit 11 and outputs the ordinary image. This process can be formulized as the following expression (1) if the computational image obtained by the image capture unit 11 is denoted by y and a recovery image, which is the ordinary image, is denoted by x.

$$y = Ax \quad (1)$$

Here, a matrix A is a sampling matrix indicating correspondence between an image at each point in the computational image captured by the image capture unit 11 and an image at a point in the recovery image. The sampling matrix A indicates a relationship between the computational image y and the recovery image x and is obtained by performing camera calibration in advance. The image generation apparatus 10 may obtain information regarding the sampling matrix A from the image capture unit 11 along with the computational image. The information regarding the sampling matrix A may indicate which point in a three-dimensional space where subjects exist each point in the computational image receives light from or indicate which straight line in a three-dimensional space where subjects exist each point in the computational image receives light from. Both pieces of information are known as camera calibration information.

If the number of pixels of the computational image y is denoted by N and the number of pixels of the recovery image x is denoted by M, for example, the computational image y is represented by an N×1 vector, the recovery image x is represented by an M×1 vector, and the sampling matrix A is represented by an N×M matrix.

Figures 14A, 14B, 15:
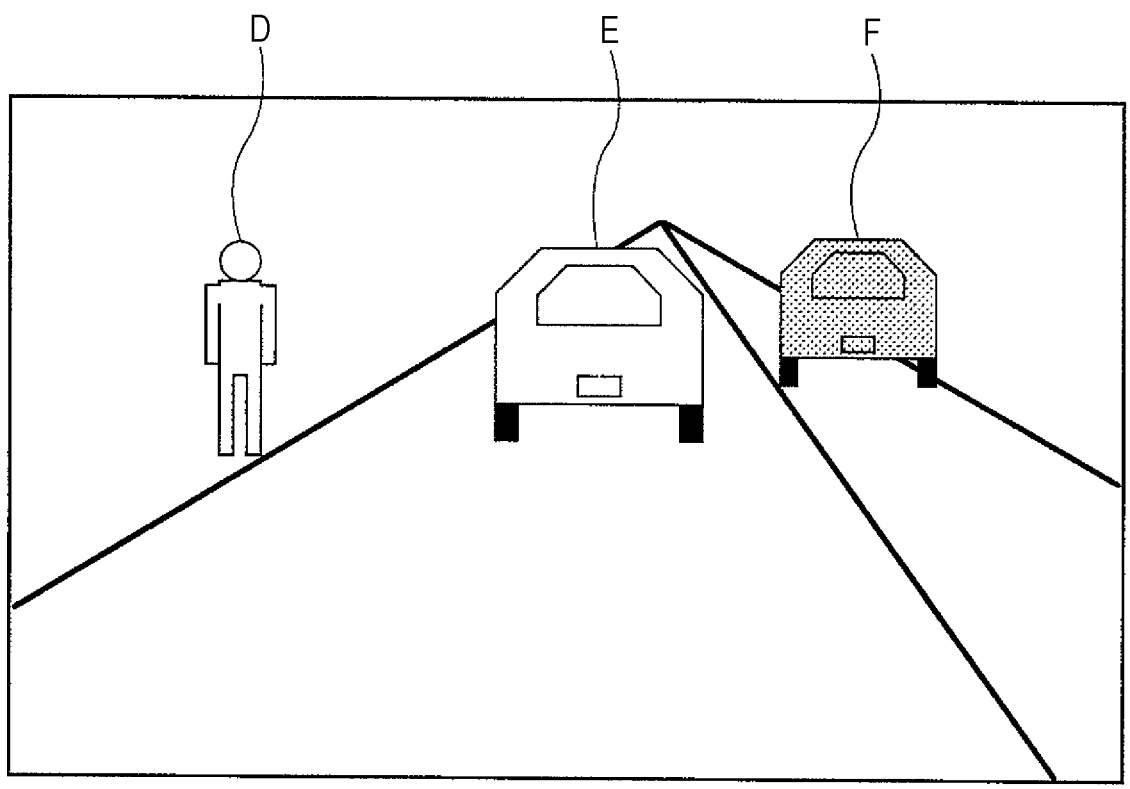
FIG. 14A is a schematic diagram illustrating an example of pixel arrangement of a computational image whose number of pixels N is 16.
FIG. 14B is a schematic diagram illustrating an example of pixel arrangement of a recovery image whose number of pixels M is 16.
FIG. 15 is a schematic diagram illustrating an example of an ordinary image recovered from a computational image.

Next, a method for calculating the recovery image x from the sampling matrix A and the computational image y used by the image recovery unit 104 will be described. FIGS. 14A and 14B schematically illustrate an example of arrangement of pixels of a computational image and a recovery image, respectively. FIG. 14A illustrates a computational image y whose number of pixels N is 16, and FIG. 14B illustrates a recovery image x whose number of pixels M is 16. The recovery image x illustrated in FIG. 14B is recovered from the computational image y illustrated in FIG. 14A. The computational image y and the recovery image x are represented by the following expression (2).

$$\left. \begin{array}{l} y = [y_1 \ y_2 \ y_3 \ \ldots \ y_{16}]^T \\ x = [x_1 \ x_2 \ x_3 \ \ldots \ x_{16}]^T \end{array} \right\} \quad (2)$$

Since M=N in this example, the number of elements of x, which is an unknown, is 16 and the number of elements of y, which is an observed number, is 16 in expression (1). Since the number of elements of an unknown and the number of equations are the same, elements of the recovery image x can be calculated by calculating an inverse matrix of the sampling matrix A. If the number of pixels N of the computational image y is smaller than the number of pixels M of the recovery image x, however, expression (1) becomes an ill-posed problem, and a solution is not uniquely obtained. In order to solve the ill-posed problem, the image recovery unit 104 uses compressive sensing. Compressive sensing is a technique in which the amount of data is compressed through weighting (i.e., coding) during sensing of a signal and an original signal is decoded (i.e., recovered) by performing recovery using the compressed data. In compressive sensing, preliminary knowledge is used to solve an ill-posed problem.

As preliminary knowledge for a natural image, total variation described in Rudin L. I., Osher S. J., and Fatemi E, "Nonlinear total variation based noise removal algorithms", Physica D, 1992, vol. 60, p. 259-268 and Shunsuke Ono and Isao Yamada, "Decorrelated Vectorial Total Variation", 2014 IEEE Conference on Computer Vision and Pattern Recognition (CVPR), 2014, for example, may be used. Total variation is the sum of absolute values of changes in luminance between close positions in an image. Alternatively, for example, sparsity described in J. Ma, "Improved Iterative Curvelet Thresholding for Compressed Sensing and Measurement", IEEE Transactions on Instrumentation & Measurement, 2011, vol. 60, No. 1, p. 126-136 may be used. Sparsity is a characteristic where many coefficients become 0 in linear transformation such as wavelet transform, DCT transform, or curvelet transform. Alternatively, for example, dictionary learning, which is disclosed in M. Aharon, M. Elad, and A. M. Bruckstein, "K-SVD: An Algorithm for Designing Overcomplete Dictionaries for Sparse Representation", IEEE Transactions on Image Processing, 2006, vol. 54, No. 11, p. 4311-4322, where transform coefficients in linear transformation are obtained through learning may be used. The recovery image x can be obtained by setting an evaluation function that uses such preliminary knowledge as a constraint term of expression (1) and optimizing the evaluation function. Such an evaluation function can be optimized, for example, by performing convex optimization such as an alternating direction method of multipliers (ADMM) described in Manya V. Afonso, Jose M. Bioucas-Dias, Mario A. T. Figueiredo "Fast Image Recovery Using Variable Splitting and Constrained Optimization", IEEE Transactions on Image Processing, 2010, vol. 19, No. 9, p. 2345-2356.

The image recovery unit 104 may change a process depending on a result of classification performed by the classification unit 102. If an image is recovered using sparsity, for example, the quality of the recovery image is improved by using different dictionaries of linear transformation depending on a result of classification. If a dictionary matrix where dictionaries of linear transformation are arranged is denoted by D and sparsity of the dictionary matrix D is used in this process, expression (1) becomes the following expression (3).

$$\operatorname*{argmin}_{z}(|ADz - y| + |z|_0) \atop \text{where} \atop x = Dz \right\} \quad (3)$$

Here, a vector z is a coefficient vector of the recovery image x in the dictionary matrix D, and a second term $|z|_0$ in expression (3) is an L0 norm of z, that is, a constraint term for making the coefficient vector z sparse. The dictionary matrix D is obtained in advance through dictionary learning. In this case, the dictionary matrix D is learned for each category of subjects, and dictionary matrices Di (i=1, 2, . . . ) are obtained. "i" corresponds to the categories of subjects. When an image is recovered, a result of classification performed by the classification unit 102, that is, a dictionary matrix Di according to a category of a classified subject, is used to improve the quality of the recovery image.

Because the optimization represented by expression (3) is difficult, the following expression (4), where the L0 norm is changed to an L1 norm, may be used, instead.

$$\operatorname*{argmin}_{z}(|ADz - y| + |z|_1) \quad (4)$$

Here, a second term $|z|_1$ of expression (4) indicates the L1 norm of z. Expression (4) can be solved through soft thresholding or the like.

The image recovery unit 104 need not necessarily perform recovery on the entirety of an image but may perform recovery on a part of an image. By performing recovery only on a part of an image, time taken to complete recovery can be reduced. If an image can be recovered through iterative calculation and the process needs to be completed within a certain period of time, the quality of the recovery image can be improved by reducing processing time of each calculation operation, because the number of iterations can be increased. The image recovery unit 104 may thus select an area to be subjected to recovery in accordance with a result of classification performed by the classification unit 102 if a part of an image is to be subjected to recovery.

As described above, for example, the classification unit 102 detects areas of people, automobiles, bicycles, traffic signals, and the like, which are category information regarding subjects, using classification bounding boxes. The image recovery unit 104 may perform image recovery in areas identified in this manner, that is, for example, areas within the classification bounding boxes. In doing so, the image recovery unit 104 performs image recovery in areas including information useful for the user, such as people, automobiles, bicycles, and traffic signals, and does not perform image recovery in areas that are not so useful, such as roads and the sky. Such an image can be considered to be a superimposition image in which recovery images within classification bounding boxes are superimposed upon a computational image. Useful areas can thus be subjected to image recovery at high speed and high quality.

Next, the process performed by the output unit 105 will be described. The output unit 105 may output an image indicating a result of classification and a recovery image while switching between the images over time. The output unit 105 temporally alternates between a recovery image and an image indicating a result of classification, that is, for example, outputs a recovery image and then outputs an image indicating a result of classification. The output unit 105 need not necessarily alternately output a recovery image and an image indicating a result of classification but may output a recovery image after outputting images indicating results of classification. Alternatively, the output unit 105 may generate a superimposition image obtained by superimposing an image indicating a result of classification upon a recovery image and then output the superimposition image.

Figure 16:
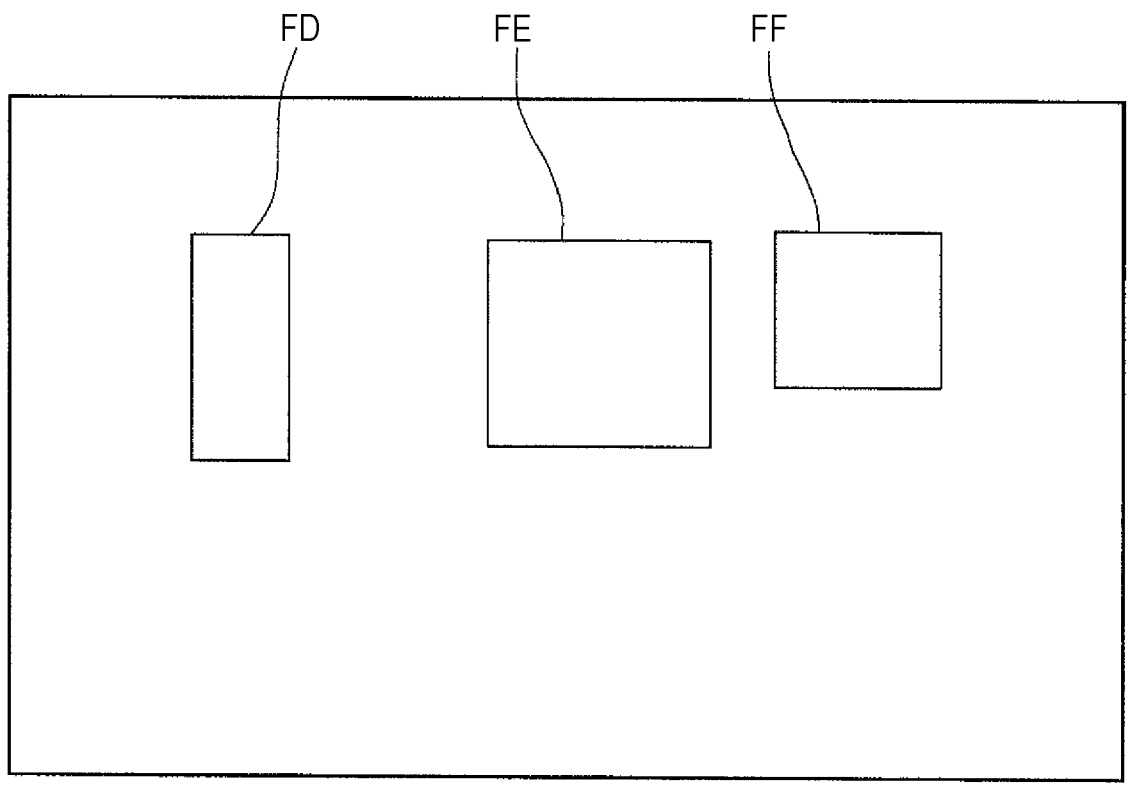
FIG. 16 is a schematic diagram illustrating an example of an image indicating a result of classification performed by the classification unit using classification bounding boxes.
Figure 17:
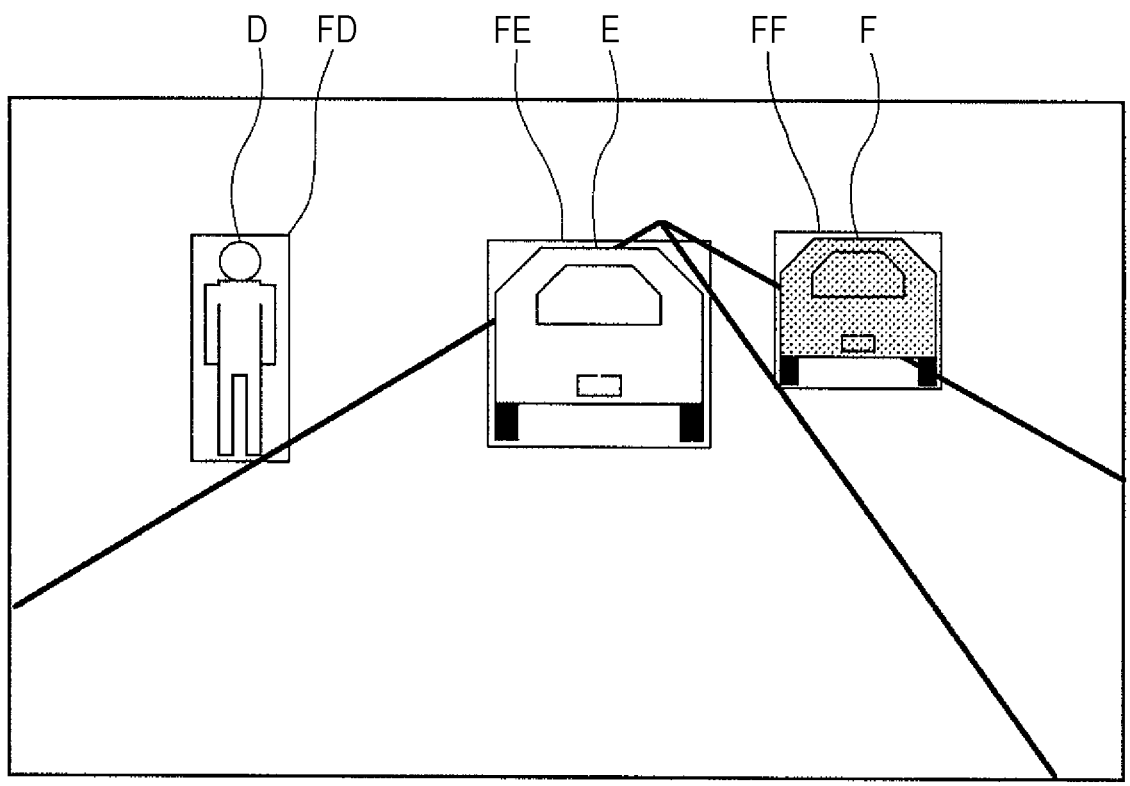
FIG. 17 is a schematic diagram illustrating an example of a superimposition image obtained by superimposing the result of the classification performed by the classification unit upon the recovery image.

For example, FIG. 15 schematically illustrates an example of an ordinary image recovered from a computational image. FIG. 16 schematically illustrates an example of an image indicating a result of classification performed by the classification unit 102 using classification bounding boxes. FIG. 17 schematically illustrates an example of a superimposition image obtained by superimposing the result of the classification performed by the classification unit 102 upon the recovery image. As illustrated in FIGS. 15 and 17, classification targets are a person D and automobiles E and F.

When generating the superimposition image illustrated in FIG. 17, the output unit 105 (a) obtains information regarding objects classified by the classification unit 102, (b) generates an image including indications corresponding to positions of the objects on a recovery image using a certain criterion, and (c) outputs the generated image. Indications corresponding to positions of objects illustrated in FIG. 17 are classification bounding boxes FD, FE, and FF surrounding the person D, the automobile E, and the automobile F, respectively. The certain criterion is a criterion for generating indications corresponding to positions of objects and, in the case of classification bounding boxes, a criterion for determining positions, shapes, and the like for objects.

When generating the image indicating a result of classification illustrated in FIG. 16, the output unit 105 (a) obtains information regarding objects classified by the classification unit 102, (b) generates an image including indications corresponding to positions of the objects on an image using a certain criterion, and (c) outputs the generated image. Indications corresponding to positions of objects illustrated in FIG. 16 are the classification bounding boxes FD, FE, and FF. The output unit 105 may display the classification bounding boxes FD, FE, and FF on an image whose background has a solid color or on a computational image.

As described with reference to FIG. 9, when the classification unit 102 performs classification for each pixel and outputs a result of the classification, the output unit 105 need not display classification bounding boxes but may superimpose the result of the classification for each pixel. In this case, the output unit 105 may replace pixels corresponding to the result of the classification with a certain color or may perform alpha blending. Alpha blending is a process in which two images, that is, two pixels, are combined with each other using a coefficient α. For example, a translucent pixel is superimposed upon a pixel by multiplying the pixel by a.

When the output unit 105 superimposes a result of classification upon a recovery image, an update rate of the result of the classification may be higher than an update rate of the recovery image. If processing performance remains constant, a processing cost, that is, processing time, for the image recovery unit 104 to obtain a recovery image is usually larger than processing time for the classification unit 102 to perform classification and output a result of the classification. If an update rate of a result of classification and an update rate of a recovery image are set the same, the update rate of a result of classification becomes lower. If the image generation apparatus 10 is used for autonomous driving of an automobile or an environment monitoring system, therefore, processes in later stages, such as driving control, might be delayed.

Figure 18:
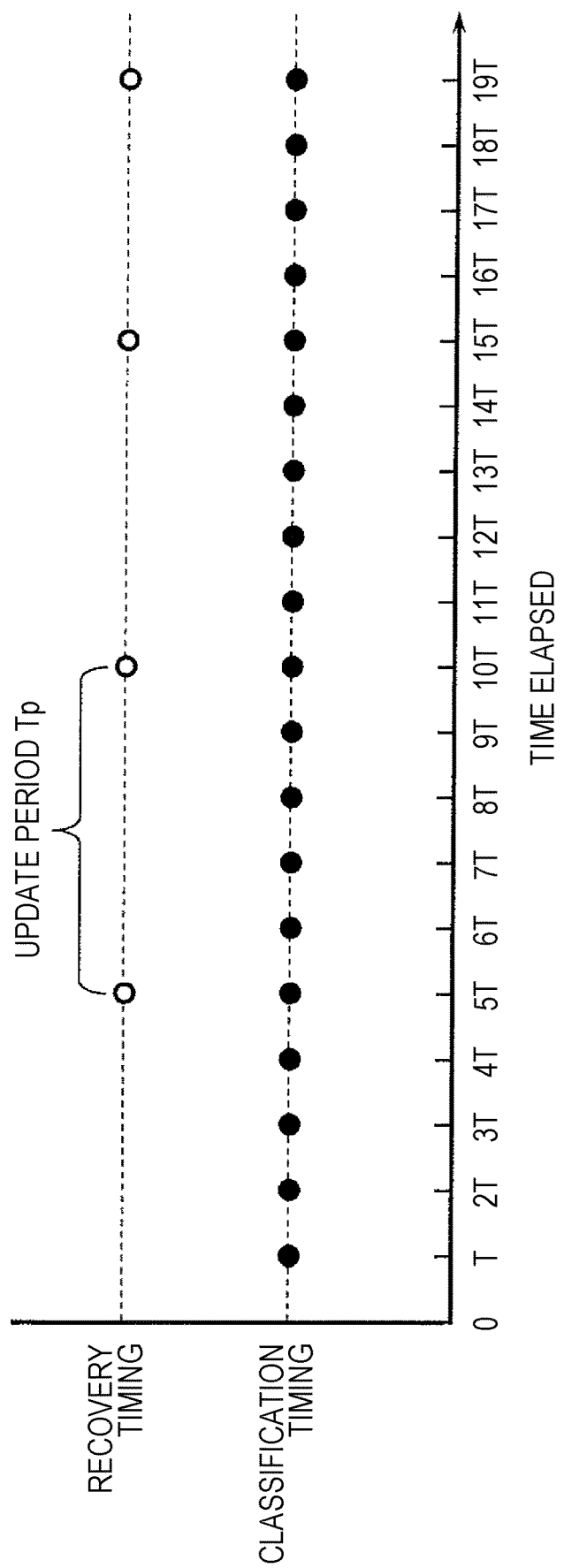
FIG. 18 is a schematic diagram illustrating an example of a relationship between output timings of the classification unit and an image recovery unit.

As illustrated in FIG. 18, if time taken for the classification unit 102 to perform classification on an image of one frame is denoted T, for example, it is assumed that time taken for the image recovery unit 104 to perform recovery on an image of one frame is 5T. FIG. 18 is a schematic diagram illustrating an example of a relationship between output timings of the classification unit 102 and the image recovery unit 104. An example of T is 1/30 (sec), and an example of 5T is 1/6 (sec). Results of classification performed on images of 30 frames are output every second, and recovery images for images of six frames are output every second. If classification is performed on every computational image, for example, one out of five computational images is subjected to image recovery. If an update rate of a result of classification and an update rate of a recovery image are set the same, therefore, results of classification performed on images of four frames are not used in an update period Tp (Tp=5T), which is a period between two update timings of recovery images. FIG. 18 illustrates an example of a case where a start timing of classification and a start timing of image recovery are the same for a single computational image. In this case, a timing at which a computational image is obtained in step S1 illustrated in FIG. 5 and step S101 illustrated in FIG. 10 may be the start timing of classification and the start timing of image recovery. The start timing of classification and the start timing of image recovery, however, may be different from each other or, that is, one may precede the other.

On the other hand, since the classification unit 102 can perform classification without image recovery, the image generation apparatus 10 can set the update rate of a result of classification higher than the update rate of a recovery image. If the image generation apparatus 10 is used for autonomous driving of an automobile or an environment monitoring system, therefore, a delay in processes in later stages, such as driving control, is not caused.

If the output unit 105 superimposes a result of classification upon a recovery image, the output unit 105 may combine the result of classification and the recovery image with each other in accordance with a timing at which a computational image to be processed is captured. Alternatively, the output unit 105 may combine the result of classification and the recovery image with each other in accordance with a processing timing. In a former first case, the output unit 105 superimposes, upon a first recovery image, results of classification performed on computational images captured in a period from a time at which a computational image of the first recovery image has been captured to a time at which a computational image of a second recovery image has been captured. In a latter second case, the output unit 105 superimposes, upon a first recovery image, results of classification output in a period from a time at which the first recovery image has been output to a time at which a second recovery image has been output. In the second case, a result of classification is superimposed upon a latest recovery image obtained. In other words, a latest result of classification is superimposed upon a latest recovery image.

Figure 19:
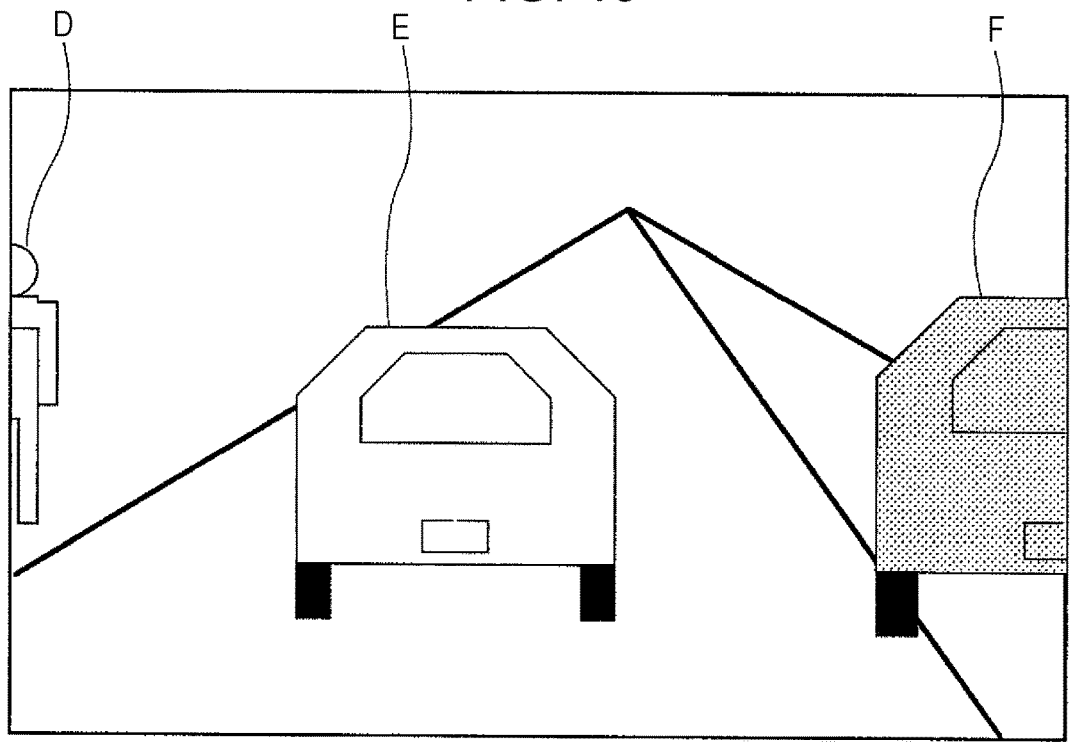
FIG. 19 is a schematic diagram illustrating an example of a recovery image at a time when time 5T has elapsed since the recovery image illustrated in FIG. 15 was captured.
Figure 20:
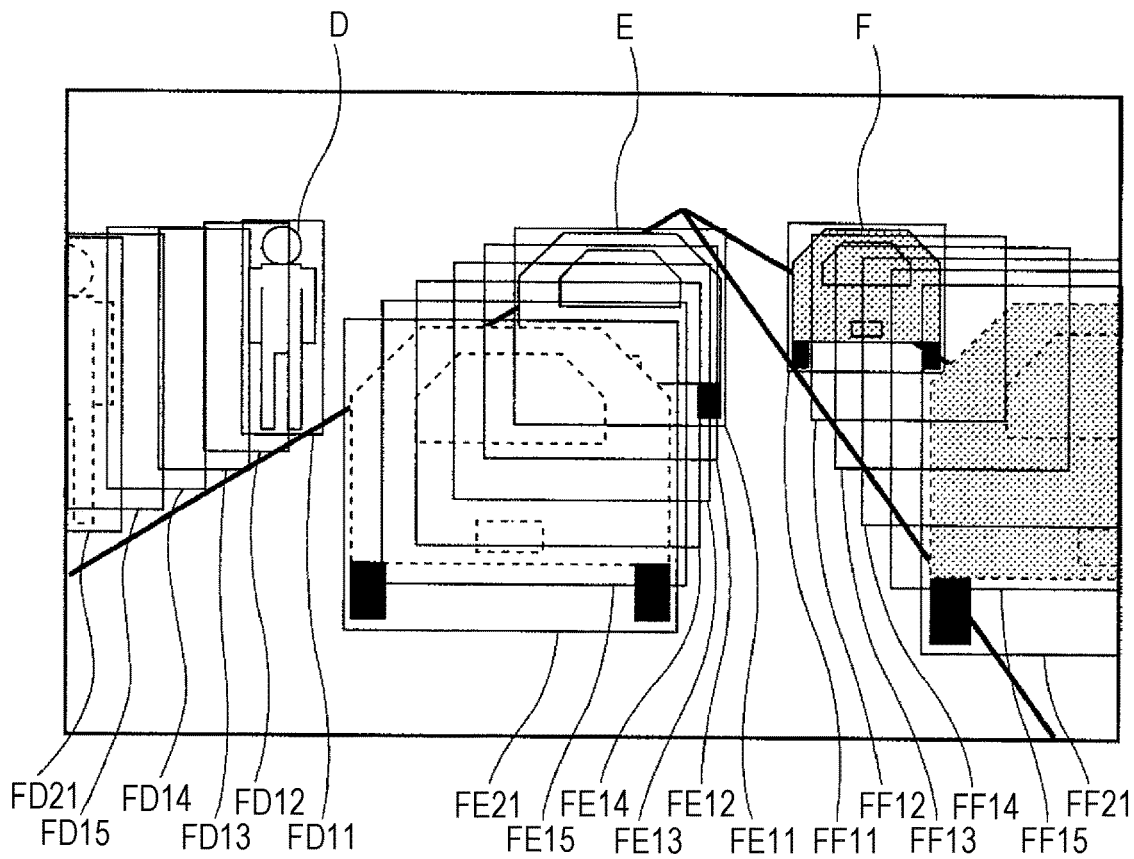
FIG. 20 is a schematic diagram illustrating an example of a superimposition image simultaneously indicating results of classification performed in a period from a time at which a first recovery image has been displayed to a time at which a second recovery image has been displayed.

For example, FIG. 19 schematically illustrates an example of a recovery image of a computational image captured when the time 5T has elapsed since the computational image of the recovery image illustrated in FIG. 15 was captured. If the recovery image illustrated in FIG. 15 is a first recovery image, the recovery image illustrated in FIG. 19 is a second recovery image, which is output following the first recovery image. FIG. 20 schematically illustrates an example of a superimposition image simultaneously indicating results of classification performed in a period from a time at which a first recovery image has been displayed to a time at which a second recovery image has been displayed.

In FIG. 20, classification bounding boxes FD11 to FD15 and FD 21, classification bounding boxes FE11 to FE15 and FE21, and classification bounding boxes FF11 to FF15 and FF21 are indications corresponding to results of classification of six frames in the period from the time at which the first recovery image has been displayed to a time at which the second recovery image has been displayed. Since the indications corresponding to the results of the classification illustrated in FIG. 20 correspond to the results of the classification performed on computational images of six frames, the classification bounding boxes FD11 to FD15 and FD 21, the classification bounding boxes FE11 to FE15 and FE21, and the classification bounding boxes FF11 to FF15 and FF21 are six boxes. The classification bounding boxes FD11 to FD15 and FD 21, the classification bounding boxes FE11 to FE15 and FE21, and the classification bounding boxes FF11 to FF15 and FF21 indicate results of classification of the person D, the automobile E, and the automobile F, respectively. The person D and the automobiles E and F indicated by broken lines may or may not be included in the superimposition image.

Figure 21:
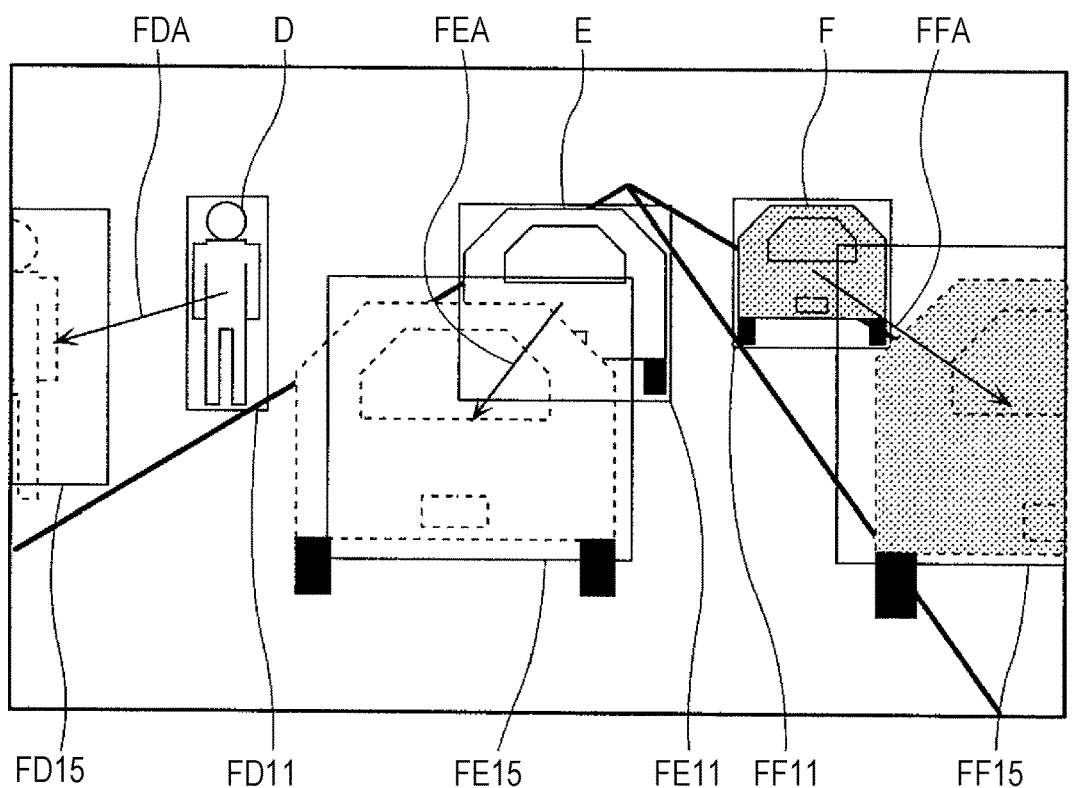
FIG. 21 is a schematic diagram illustrating an example in which arrows connecting corresponding results of classification to each other are drawn over a superimposition image.

If the output unit 105 superimposes a result of classification upon a recovery image, the output unit 105 need not display the result of the classification and the recovery image but may superimpose another image. In order to clearly indicate correspondence between results of classification of different frames, for example, the output unit 105 may draw arrows connecting corresponding results of classification to one another over a superimposition image. For example, FIG. 21 schematically illustrates an example in which arrows connecting corresponding results of classification to each other are drawn over a superimposition image. In FIG. 21, two out of the six classification bounding boxes illustrated in FIG. 20 are superimposed upon the first recovery image, and arrows connecting the two classification bounding boxes to each other are drawn. An arrow FDA connects the classification bounding boxes FD11 and FD15, which are results of classification of the person D, to each other. An arrow FEA connects the classification bounding boxes FE11 and FE15, which are results of classification of the automobile E, to each other. An arrow FFA connects the classification bounding boxes FF11 and FF15, which are results of classification of the automobile F, to each other. The classification bounding boxes connected by arrows are not limited to these. If the image generation apparatus 10 is used for autonomous driving of an automobile or an environment monitoring system, moving directions and moving speeds of nearby objects can be recognized by using the arrows as vectors. The system and the like, therefore, can predict movement of nearby objects. In addition, a problem that a delay is caused in processes in later stages, such as driving control, can be solved. In addition, the user can recognize not only presence or absence of nearby objects but also moving directions and moving speeds of the nearby objects by visually checking an image. The person D and the automobiles E and F indicated by broken lines may or may not be included in a superimposition image.

Figure 22:
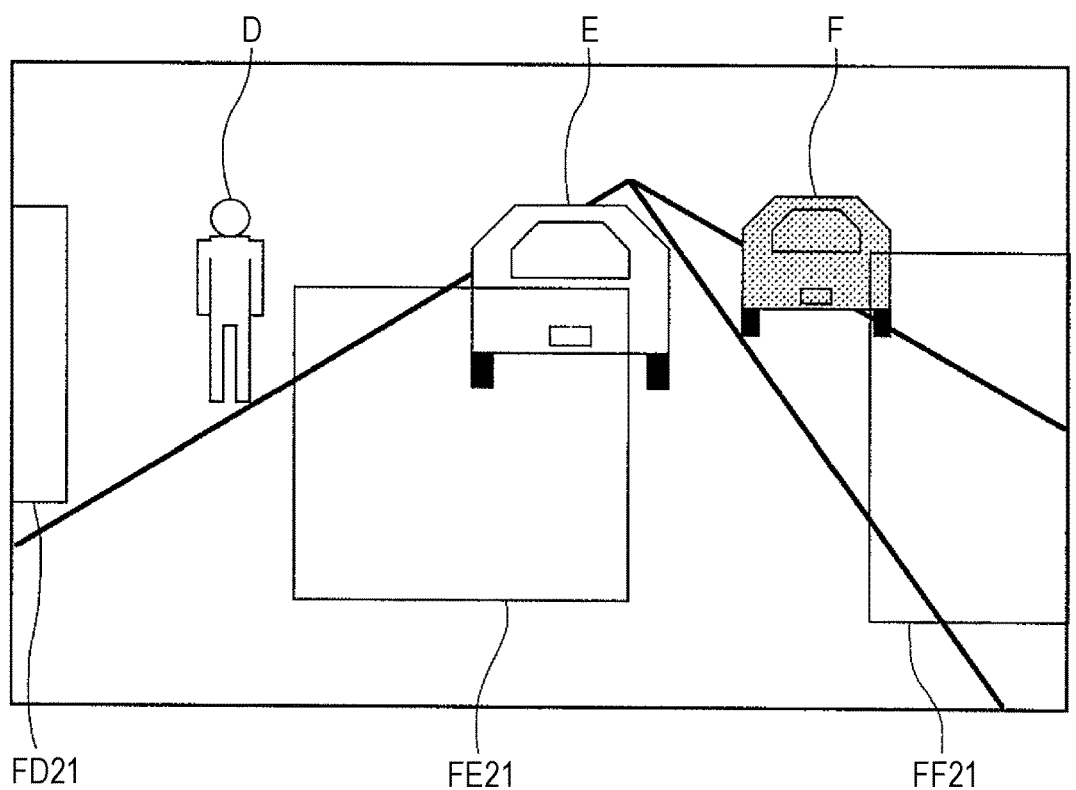
FIG. 22 is a schematic diagram illustrating an example of a superimposition image obtained by superimposing a result of classification performed by the classification unit upon a recovery image for which a computational image earlier than a computational image used for the classification has been used.

If the output unit 105 superimposes a result of classification upon a recovery image, a computational image used by the image recovery unit 104 for the recovery image may be an image obtained before a computational image used by the classification unit 102 for classification. As described above, a processing cost for the image recovery unit 104 to obtain a recovery image is usually higher than a processing cost for the classification unit 102 to output a result of classification. If the image recovery unit 104 and the classification unit 102 start to perform their respective processes at the same timing, therefore, the update rate of a result of classification becomes lower. The image recovery unit 104, therefore, uses, for a recovery image, a computational image earlier than a computational image used by the classification unit 102 for classification, in order to start the process before the classification unit 102 starts to perform the classification. For example, FIG. 22 schematically illustrates an example of a superimposition image obtained by superimposing a result of classification performed by the classification unit 102 upon a recovery image for which a computational image earlier than a computational image used for the classification has been used. In FIG. 22, the classification bounding boxes FD21, FE21, and FF21, which are results of classification, are superimposed upon a first recovery image. In doing so, a latest result of classification is output and displayed without being affected by recovery of a recovery image. If the image generation apparatus 10 is used for autonomous driving of an automobile or an environment monitoring system, therefore, a problem that a delay is caused in processes in later stages, such as driving control, can be solved.

As described above, the image generation apparatus 10 according to the embodiment and the modification includes the output unit 105 that outputs subject information obtained by the classification unit 102 and a recovery image recovered by the image recovery unit 104 while separately updating the subject information and the recovery image. As a result, the image generation apparatus 10 can promptly output a result of classification. If the image generation apparatus 10 is used for autonomous driving of an automobile or an environment monitoring system, therefore, a problem that a delay is caused in processes in later stages, such as driving control, can be solved.

Figure 23:
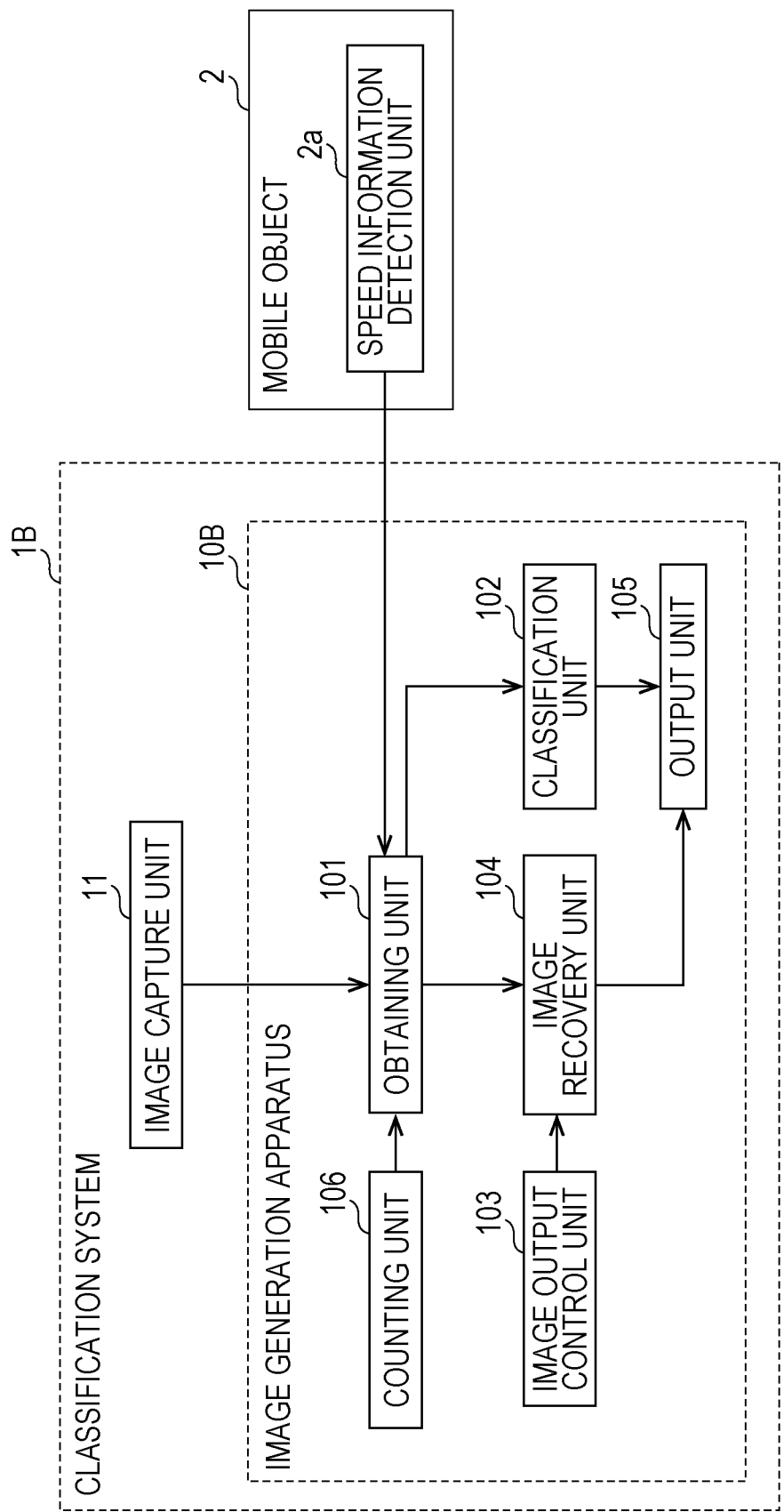
FIG. 23 is a schematic diagram illustrating an example of the functional configuration of a classification system according to another modification of the embodiment.

Alternatively, as illustrated in FIG. 23, the image generation apparatus 10 may be configured to obtain speed information regarding a mobile object from the mobile object. FIG. 23 is a schematic diagram illustrating the functional configuration of a classification system 1B according to another modification of the embodiment. An image generation apparatus 10B of the classification system 1B according to the present modification further includes, unlike in the embodiment, a counting unit 106 that counts time. The counting unit 106 is, for example, a timer, a clock, or the like. The counting unit may be included in the classification system 1B or a mobile object 2, instead. The obtaining unit 101 of the image generation apparatus 10B obtains speed information regarding the mobile object 2 from a speed information detection unit 2a of the mobile object 2 on which the classification system 1B is provided. The classification system 1B and the mobile object 2 communicate information with each other through wired communication or wireless communication. Wired communication or wireless communication to be employed may be any of the above-described types of communication.

If the mobile object 2 includes a speedometer, the speed information detection unit 2a is the speedometer or a computer of the mobile object 2 that receives speed information from the speedometer. If the mobile object 2 does not include a speedometer, the speed information detection unit 2a is a GPS device, an inertia measuring device such as an accelerometer or an angular velocity sensor, or the like included in the mobile object 2. The speed information may be the speed of the mobile object 2 or an element with which the speed of the mobile object 2 can be calculated, such as a position, acceleration, angular velocity, or geomagnetism of the mobile object 2. The speed information may include a time at which a value of the element relating to the speed has been detected. The obtaining unit 101 may obtain the speed information regarding the mobile object 2 in real-time or regularly. The obtaining unit 101 outputs the speed information regarding the mobile object 2 to the output unit 105 directly or indirectly through the classification unit 102 and/or the image recovery unit 104.

The obtaining unit 101 obtains a time at which the image capture unit 11 has captured a computational image on the basis of time counted by the counting unit 106 and associates the capture time and the computational image with each other. The obtaining unit 101 may determine a time at which the obtaining unit 101 has obtained a computational image from the image capture unit 11 as a capture time. If the image capture unit 11 includes a counting unit, the obtaining unit 101 may obtain, from the image capture unit 11 along with the computational image, a time at which a computational image has been captured. The obtaining unit 101 outputs the computational image and the capture time to the classification unit 102 and the image recovery unit 104 while associating the computational image and the capture time with each other. The output unit 105 can obtain, from the classification unit 102 or the image recovery unit 104, a time at which a computational image has been captured.

The obtaining unit 101 also associates a computational image and speed information temporally the same as or closest to each other on the basis of times at which computational images have been captured and times at which speed information regarding the mobile object 2 has been detected or obtained. The obtaining unit 101 may output information regarding a computational image corresponding to speed information regarding the mobile object 2 to the output unit 105 along with the speed information.

The output unit 105 generates a superimposition image as described hereinafter for a first recovery image, which is a recovery image of a first computational image captured at a certain time, and a second recovery image, which is a recovery image of a second computational image captured after the first computational image and subjected to image recovery following the first computational image.

The output unit 105 calculates a difference between the time at which the first computational image has been captured and a time at which the second computational image has been captured. If the first recovery image has been generated but the second recovery image has not been generated within a certain period of time after the classification unit 102 identified positions of objects in the second computational image, the output unit 105 performs the following process. More specifically, if the difference is equal to or smaller than a first threshold, the output unit 105 superimposes classification bounding boxes, which are a result of classification performed on the second computational image, upon the first recovery image. If the difference is larger than the first threshold, the output unit 105 displays the first recovery image without superimposing classification bounding boxes, which are a result of classification performed on the second computational image, upon the first recovery image.

The certain period of time is a period of time over which a scene whose image is captured by the image capture unit 11 can significantly change after the second computational image is captured. If a result of classification performed on the second computational image is superimposed upon the first recovery image or the second recovery image after the certain period of time, what is indicated by a resultant superimposition image and a condition around the mobile object 2, that is, a current condition, might be irrelevant to each other. In this case, if the difference between the time at which the first computational image has been captured and the time at which the second computational image has been captured is large enough to exceed the first threshold, the irrelevance might become evident. If the difference between the time at which the first computational image has been captured and the time at which the second computational image has been captured is small enough to be equal to or smaller than the first threshold, on the other hand, the irrelevance is suppressed, and a result of classification performed on the second computational image is superimposed upon the first recovery image that has already been generated.

The certain period of time may be set on the basis of the moving speed of the mobile object 2. As the moving speed of the mobile object 2 becomes higher, changes in the condition around the mobile object 2 in unit time become larger. For this reason, the certain period of time is set shorter as the moving speed of the mobile object 2 becomes higher. The certain period of time may gradually change as the moving speed of the mobile object 2 increases or decreases or may change stepwise using a certain speed, such as a second threshold, as a boundary. If the moving speed of the mobile object 2 is lower than the second threshold, for example, the certain period of time may remain the same. If the moving speed of the mobile object 2 is equal to or higher than the second threshold, the certain period of time may become shorter on the basis of the moving speed. The moving speed may be an average between a speed of the mobile object 2 when the first computational image has been captured and a speed of the mobile object 2 when the second computational image has been captured or may be either the speed of the mobile object 2 when the first computational image has been captured or the speed of the mobile object 2 when the second computational image has been captured.

In addition, the first threshold may be set on the basis of the moving speed of the mobile object 2. The first threshold, too, may become shorter as the moving speed of the mobile object 2 becomes higher. As with the certain period of time, the first threshold may change gradually or stepwise in accordance with an increase or a decrease in the moving speed.

In addition, the output unit 105 may determine whether to display a superimposition image on the basis of the moving speed of the mobile object 2. If the moving speed of the mobile object 2 is high enough to exceed a third threshold, the output unit 105 displays a recovery image without superimposing a result of classification. If the moving speed of the mobile object 2 is low enough to become equal to or lower than the third threshold, on the other hand, the output unit 105 displays a recovery image upon which a result of classification is superimposed, that is, a superimposition image. If the moving speed of the mobile object 2 is too high, the condition around the mobile object and what is indicated by the recovery image is irrelevant to each other. An image obtained by superimposing a result of classification upon such a recovery image might make the user misunderstand the condition. The third threshold may correspond to a speed at which a scene around the mobile object 2 can significantly change at time intervals of generation of a recovery image.

Although the image generation apparatus 10B performs the above process using speed information regarding the mobile object 2 obtained from the speed information detection unit 2a of the mobile object 2, a type of process performed by the image generation apparatus 10B is not limited to this. The image generation apparatus 10B may determine, on the basis of a difference between computational images of different frames captured by the image capture unit 11, whether the moving speed of the mobile object 2 or a scene around the mobile object 2 has significantly changed. In this case, the image generation apparatus 10B may calculate, between the different frames, a difference in a position of the same subject, that is, for example, a position of a classification bounding box, obtained as a result of classification performed on the computational images. The image generation apparatus 10B may then calculate a difference in the position of the subject in unit time on the basis of a capture time interval between the frames. If the difference in the position of the subject in unit time is equal to or larger than a certain threshold, the image generation apparatus 10B may determine that the moving speed of the mobile object 2 is high or that the scene around the mobile object 2 has significantly changed.

As described above, with the image generation apparatuses according to the embodiment and the modifications, a position of an object in a computational image is identified using the computational image. The identified position of the object is then highlighted in a display image. That is, since an object can be classified without recovering a recovery image from a computational image, processing speed can be improved without increasing a processing cost. In addition, since an identified position of an object is highlighted in an image displayed by the image generation apparatuses, the user can easily recognize the position.

In particular, the image generation apparatuses do not recover an ordinary image from a computational image in a classification process but recovers an ordinary image after the classification process as necessary upon a request from the user. The image generation apparatuses identify subjects in a computational image on the basis of texture information included in the computational image and depth information included in virtual focus position images calculated from the computational image. The image generation apparatuses, therefore, can reduce the amount of processing performed to identify subjects. Furthermore, the image generation apparatuses can achieve more accurate classification than classification based on texture images employing conventional ordinary images.

In addition, the image generation apparatuses output subject information obtained by the classification unit 102 and a recovery image recovered by the image recovery unit 104 while separately updating the subject information and the recovery image. As a result, the image generation apparatuses can promptly output a result of classification.

In addition, the image generation apparatuses cause classification devices to perform learning and classification using depth information and image information regarding computational images. As a result, the image generation apparatuses can achieve more accurate classification at lower cost than classification devices that use images.

Others

Although the image generation apparatuses and the like according to one or more aspects have been described above on the basis of the embodiment and the modifications, the present disclosure is not limited to the embodiment and the modifications. The scope of the one or more aspects may include modes obtained by modifying the embodiment and the modifications in various ways conceivable by those skilled in the art and modes constructed by combining components in the embodiment and the modifications without deviating from the spirit of the present disclosure.

For example, although the image generation apparatuses according to the embodiment and the modifications superimpose classification bounding boxes for highlighting positions of objects identified in a computational image upon a recovery image of the computational image, the classification bounding boxes may be superimposed upon the computational image or a predetermined background image, such as a background having a solid color, instead.

In addition, the techniques in the present disclosure may also be techniques described hereinafter. For example, an image generation apparatus according to an aspect of the present disclosure includes an image capture unit that, unlike a common camera, captures a computational image that can be recognized by a person by performing image processing on the computational image, a classification unit that identifies, in the computational image obtained by the image capture unit, category information and positional information regarding a subject such as a person, an automobile, a bicycle, or a traffic signal, an image output control unit that determines an image to be output from an output unit, an image recovery unit that generates, from the computational image captured by the image capture unit in accordance with the image output control unit, an image that can be recognized by a person, and the output unit that outputs the selected image in accordance with the image output control unit.

For example, in the image generation apparatus, the computational image may be a light-field image, a compressive sensing image, or a coded image.

For example, in the image generation apparatus, the image capture unit may be a lensless camera that does not include an optical imaging system based on refraction.

For example, in the image generation apparatus, the classification unit may be achieved through deep learning.

For example, in the image generation apparatus, the classification unit may update a neural network in accordance with the image capture unit.

For example, in the image generation apparatus, the classification unit may identify the subject using depth information and texture information regarding the computational image.

For example, the image generation apparatus may include at least either a communication unit or an interface unit. The image output control unit may receive an instruction set by a user.

For example, in the image generation apparatus, the image output control unit may switch image information to be output in accordance with a result of classification performed by the classification unit.

For example, in the image generation apparatus, the image recovery unit may perform image recovery using the result obtained by the classification unit.

For example, in the image generation apparatus, the image recovery unit may switch a dictionary to be used for the image recovery in accordance with the result of the classification performed by the classification unit.

For example, in the image generation apparatus, the image recovery unit may perform recovery on a part of an image and determine a position of the part in accordance with the result of the classification performed by the classification unit.

For example, in the image generation apparatus, the output unit may simultaneously superimpose results of classification performed by the classification unit.

For example, in the image generation apparatus, if the output unit simultaneously outputs the result of the classification performed by the classification unit and an image recovered by the image recovery unit, an update rate of the result of the classification may be higher than an update rate of a result of the recovery of the recovery image.

In addition, a classification system according to an aspect of the present disclosure is a classification system that identifies a surrounding condition. The classification system includes a learning apparatus and an image generation apparatus. The learning apparatus includes an image obtaining unit that simultaneously obtains image information and depth information, a classification correct information obtaining unit that indicates where a classification target exists in a computational image obtained by the image obtaining unit, and a learning unit that performs learning for a classification device using the computational image obtained by the image obtaining unit and classification correct information obtained by the classification correct information obtaining unit. The image generation apparatus includes an obtaining unit that simultaneously obtains image information and depth information, a classification unit that performs, using the classification device subjected to the learning performed by the learning unit, classification on a computational image obtained by the obtaining unit, and an output unit that outputs a result of the classification performed by the classification unit.

For example, in the classification system, the classification unit may include a texture information classification unit that performs, using texture information, classification on the computational image obtained by the obtaining unit, a depth information classification unit that identifies depth information in the computational image obtained by the obtaining unit, and an integration classification unit that integrates together the results of the classification performed by the texture information classification unit and the depth information classification unit and outputs a final result of classification.

For example, in the classification system, the classification unit may be achieved through deep learning.

For example, in the classification system, the depth information classification unit may be achieved by a full connected layer of a neural network.

For example, in the classification system, the classification unit may include a depth information classification unit that extracts depth information from the computational image obtained by the image obtaining unit, a texture information classification unit that performs, using texture information, classification on the depth information extracted by the depth information classification unit, and an integration classification unit that integrates together results obtained by the texture information classification unit and outputs a final result of classification.

For example, in the classification system, the depth information classification unit may output an image in which a position corresponding to each depth value is in focus.

For example, in the classification system, the image obtaining unit and the obtaining unit may obtain the computational images captured by a multiple pinhole camera.

For example, in the classification system, the image obtaining unit and the obtaining unit may obtain the computational images captured through coded image capture.

For example, in the classification system, the classification correct information obtaining unit may provide classification correct information for a virtual focus position image generated from the computational image obtained by the image obtaining unit while assuming a virtual depth value.

For example, in the classification system, the classification correct information obtaining unit may provide a category to be identified and positional information in the virtual focus position image for the virtual focus position image.

A method for generating an image to be displayed on a display according to another modification of the embodiment will be described. The following description does not limit the above embodiment and the like. FIG. 24 is a schematic diagram illustrating the method for generating an image according to the other modification of the embodiment.

In FIG. 24(a), the image capture unit 11 captures a computational image $I_{(1)}$ at a time $t_{I(1)}, \ldots$, a computational image $I_{(k)}$ at a time $t_{I(k)}, \ldots$, and a computational image $I_{(n)}$ at a time $t_{I(n)}$. Here, $t_{I(1)} < \ldots < t_{I(k)} < \ldots < t_{I(n)}$. The obtaining unit 101 obtains the computational images $I_{(1)}, \ldots, I_{(k)}, \ldots$, and $I_{(n)}$ from the image capture unit 11.

In FIG. 24(b), the classification unit 102 recognizes an object image $Io_{(1)}$ included in the computational image $I_{(1)}$ without performing recovery on the computational image $I_{(1)}$, determines a position $P_{(1)}$ of the object image $Io_{(1)}$ at a time $t_{p(1)}, \ldots$, recognizes an object image $Io_{(k)}$ included in the computational image $I_{(k)}$ without performing recovery on the computational image $I_{(k)}$, determines a position $P_{(k)}$ of the object image $Io_{(k)}$ at a time $t_{p(k)}, \ldots$, recognizes an object image $Io_{(n)}$ included in the computational image $I_{(n)}$ without performing recovery on the computational image $I_{(n)}$, and determines a position $P_{(n)}$ of the object image $Io_{(n)}$ at a time $t_{p(n)}$. The computational images $I_{(1)}, \ldots, I_{(k)}, \ldots$, and $I_{(n)}$ are light-field images, compressive sensing images, or coded images.

In FIG. 24(c), the image recovery unit 104 performs, on the basis of a determination made by the image output control unit 103, image recovery on a computational image $Ic_{(1)}$ included in the $I_{(1)}, \ldots, I_{(k)}, \ldots$, and $I_{(n)}$ obtained by the image capture unit 11 to generate a recovery image $D_{(1)}, \ldots$, performs image recovery on a computational image $Ic_{(i)}$ included in the $I_{(1)}, \ldots, I_{(k)}, \ldots$, and $I_{(n)}$ obtained by the image capture unit 11 to generate a recovery image $D_{(i)}, \ldots$, performs image recovery on a computational image $Ic_{(p)}$ included in the $I_{(1)}, \ldots, I_{(k)}, \ldots$, and $I_{(n)}$ obtained by the image capture unit 11 to generate a recovery image $D_{(p)}$. The generation of the recovery image $D_{(1)}$ is completed at the time $t_{D(1)}, \ldots$, the generation of the recovery image $D_{(i)}$ is completed at the time $t_{D(i)}, \ldots$, and the generation of the recovery image $D_{(p)}$ is completed at the time $t_{D(p)}$. Here, $t_{D(1)} < \ldots < t_{D(i)} < \ldots < t_{D(p)}$. The number of recovery images $D_{(1)}, \ldots, D_{(i)}, \ldots$, and $D_{(p)}$ is smaller than the number of computational images $I_{(1)}, \ldots, I_{(k)}, \ldots$, and $I_{(n)}$.

In FIG. 24(a) to (c), although the computational image $I_{(k)}$ is subjected to image recovery to generate the recovery image $D_i$, computational images $I_{(k+1)}$ to $I_{(k+4)}$ are not subjected to image recovery. Although a computational image $I_{(k+5)}$ is subjected to image recovery to generate a recovery image $D_{(i+1)}$, computational images $I_{(k+6)}$ to $I_{(k+9)}$ are not subjected to image recovery. That is, one recovery image is generated for every five computational images.

In FIG. 24(d), the output unit 105 generates images $DI_{(1)}, \ldots, DI_{(k)}, \ldots$, and $DI_{(n)}$ to be displayed on a display. An image $DI_{(k+5)}$ is an image obtained by superimposing a highlight $PS_{(k+5)}$ upon the recovery image $D_{(i)}$ recovered at the time $t_{D(i)}$ at a position included in the recovery image $D_{(i)}$ on the basis of a position indicated by a position $P_{(k+5)}$ determined at a time $t_{P(k+5)}$.

The time $tD_{(i)}$ is closest to the time $t_{P(k+5)}$ among the times $t_{D(1)}$ to $t_{D(i)}$, which are earlier than the time $t_{P(k+5)}$ among the times $t_{D(1)}$ to $t_{D(p)}$.

The method for generating an image to be displayed on a display according to the other modification of the embodiment has been described.

In the present disclosure, some or all of the units, the apparatuses, the members, or the sections or some or all of the functional blocks illustrated in the block diagrams of the drawings may be achieved by one or more electronic circuits including a semiconductor device, a semiconductor integrated circuit (IC), or a large-scale integration (LSI) circuit. The LSI circuit or the IC may be integrated on a single chip or may be fabricated by combining chips. For example, a functional block other than a storage device may be integrated on a single chip. Although terms "LSI" or "IC" is used here, other terms such as "system LSI", "very-large-scale integration (VLSI)", or "ultra-large-scale integration (ULSI)" may be used depending on a degree of integration. A field-programmable gate array (FPGA), which is programed after fabrication of an LSI circuit, or a reconfigurable logic device, in which connection relationships in an LSI circuit can be reconfigured or circuit sections in an LSI circuit can be set up, may be used for the same purpose.

Furthermore, functions or operations of some or all of the units, the apparatuses, the members, or the sections may be achieved through a software process. In this case, software is stored in at least one non-transitory storage medium such as a ROM, an optical disc, or a hard disk drive. When a processor has executed the software, functions specified by the software are achieved by the processor and peripheral devices.

A system or an apparatus may include the one or more non-transitory storage media storing the software, the processor, and a hardware device.

The numbers used in the above description, such as ordinals and quantities, have all been used as examples to specifically describe the techniques in the present disclosure, and the present disclosure is not limited to the numbers. The connection relationships between the components have been described as examples in order to specifically describe the techniques in the present disclosure, and connection relationships for achieving the functions in the present disclosure are not limited to these.

The division of the functional blocks in the block diagrams is an example, and some functional blocks may be achieved as a single functional block, a single functional block may be divided into discrete functional blocks, or some functions may be transported to another functional block, instead. In addition, functions of some functional blocks having similar functions may be processed by a single piece of hardware or software in parallel with one another or in time division.

The techniques in the present disclosure can be widely applied as techniques for recognizing objects in computational images. The techniques in the present disclosure can also be widely applied when image capture apparatuses that capture computational images are provided on mobile objects and used for, for example, autonomous driving techniques for automobiles, robots, environment monitoring camera systems, and the like.

What is claimed is:

1. An image generation apparatus comprising:
a processing circuit; and
a memory storing at least one computational image,
wherein the at least one computational image is a light-field image, a compressive sensing image, or a coded image,
wherein the processing circuit
(a1) identifies a position of an object in the at least one computational image using a classification device,
(a2) generates, using the at least one computational image, a display image in which an indication for highlighting the position of the object is superimposed, and
(a3) outputs the display image,
wherein the processing circuit also
(a4) performs recovery on the at least one computational image to generate a recovery image, and
generates, in (a2), a display image by superimposing the indication for highlighting the position of the object upon the recovery image, and
wherein the processing circuit performs (a1) at higher speed than for (a4).

2. The image generation apparatus according to claim 1, wherein the processing circuit also
(a4) performs recovery on the at least one computational image to generate a recovery image, and
generates, using the latest recovery image, after identifying the position of the object in the at least one computational image in (a2), a display image in which the indication for highlighting the position of the object is superimposed.

3. The image generation apparatus according to claim 2, wherein the processing circuit simultaneously starts (a1) and (a4).

4. The image generation apparatus according to claim 1, wherein the processing circuit also
(a5) generates, in the at least one computational image, a partial recovery image corresponding to the identified position of the object, and
generates, in (a2), the display image by superimposing the partial recovery image upon the at least one computational image.

5. An image generation apparatus comprising:
a processing circuit; and
a memory storing at least one computational image,
wherein the at least one computational image is a light-field image, a compressive sensing image, or a coded image,
wherein the processing circuit
(a1) identifies a position of an object in the at least one computational image using a classification device,
(a2) generates, using the at least one computational image, a display image in which an indication for highlighting the position of the object is superimposed, and
(a3) outputs the display image,
wherein the at least one computational image includes first and second images,
wherein the first and second images have been captured in this order, and
wherein the processing circuit
identifies, in (a1), a position of an object included in the first image and then identifies a position of an object included in the second image,
(a4) performs recovery on the first image to generate a first recovery image and then performs recovery on the second image to generate a second recovery image, and
obtains, if the first recovery image is generated but the second recovery image is not generated within a first certain period of time after the position of the object included in the second image is identified in (a1), a first capture time, at which the first image has been captured, and a second capture time, at which the second image has been captured, calculates a difference between the first and second capture times, and, if the difference is equal to or smaller than a first threshold, generates a display image by superimposing the position of the object included in the second image upon the first recovery image and, if the difference is larger than the first threshold, determines the first recovery image as the display image without superimposing the position of the object included in the second image upon the first recovery image.

6. The image generation apparatus according to claim 5, wherein an image capturer that captures the at least one computational image is provided on a mobile object, and
wherein the processing circuit
obtains the at least one computational image from the image capturer and stores the at least one computational image in the memory, and
obtains, if the first recovery image has been generated but the second recovery image has not been generated when the position of the object included in the first image has been identified in (a1), moving speed of the mobile object at a time when the first and second images have been obtained and sets the first certain period of time on the basis of the moving speed.

7. The image generation apparatus according to claim 6, wherein, if the moving speed is lower than a second threshold, the processing circuit does not change the first threshold, and if the moving speed is equal to or higher than the second threshold, the processing circuit shortens the first threshold on the basis of the moving speed.

8. An image generation apparatus comprising:

a processing circuit; and a memory storing at least one computational image, wherein the at least one computational image is a light-field image, a compressive sensing image, or a coded image, wherein the processing circuit (a1) identifies a position of an object in the at least one computational image using a classification device, (a2) generates, using the at least one computational image, a display image in which an indication for highlighting the position of the object is superimposed, and (a3) outputs the display image, wherein an image capturer that captures the at least one computational image is provided on a mobile object, and wherein the processing circuit obtains the at least one computational image from the image capturer and stores the at least one computation image in the memory, obtains moving speed of the mobile object, and generates, if the moving speed is equal to or lower than a third threshold, a display image in which the indication for highlighting the position of the object is superimposed in (a2) using the at least one computational image and generates, if the moving speed is higher than the third threshold, an image based on the at least one computational image in which the position of the object is not highlighted in (a2) as a display image.

9. An image generation apparatus comprising:

a processing circuit; and a memory storing at least one computational image, wherein the at least one computational image is a light-field image, a compressive sensing image, or a coded image, wherein the processing circuit (a1) identifies a position of an object in the at least one computational image using a classification device, (a2) generates, using the at least one computational image, a display image in which an indication for highlighting the position of the object is superimposed, and (a3) outputs the display image, and wherein the at least one computational image includes a first computational image and a second computational image, the second computational image is imaged after the first computational image is imaged, a positon of the indication in the display image is determined on the basis of a first position of the object in the first computational image, and the position of the object in the display image is determined on the basis of a second position of the object in the second computational image.

* * * * *